United States Patent
Cho et al.

(10) Patent No.: US 11,506,776 B2
(45) Date of Patent: Nov. 22, 2022

(54) METHOD AND DEVICE WITH IMPROVED RADAR RESOLUTION

(71) Applicant: Samsung Electronics Co., Ltd., Suwon-si (KR)

(72) Inventors: Hyunwoong Cho, Seoul (KR); Byung Kwan Kim, Suwon-si (KR); Jong-Sok Kim, Hwaseong-si (KR); Sungdo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 16/658,229

(22) Filed: Oct. 21, 2019

(65) Prior Publication Data

US 2020/0400810 A1 Dec. 24, 2020

(30) Foreign Application Priority Data

Jun. 19, 2019 (KR) .................. 10-2019-0073012

(51) Int. Cl.
| | | |
|---|---|---|
| *G01S 13/58* | (2006.01) | |
| *G01S 13/89* | (2006.01) | |
| *G01S 7/35* | (2006.01) | |
| *G01S 13/931* | (2020.01) | |
| *G06T 3/40* | (2006.01) | |

(52) U.S. Cl.
CPC .......... *G01S 13/583* (2013.01); *G01S 7/352* (2013.01); *G01S 13/89* (2013.01); *G01S 13/931* (2013.01); *G06T 3/4053* (2013.01); *G01S 7/356* (2021.05)

(58) Field of Classification Search
CPC ........ G01S 13/583; G01S 7/352; G01S 13/89; G01S 13/931; G06T 3/4053
See application file for complete search history.

(56) References Cited

U.S. PATENT DOCUMENTS

| | | | | |
|---|---|---|---|---|
| 7,245,250 | B1* | 7/2007 | Kalayeh | G01S 13/9017 342/25 R |
| 8,989,519 | B2* | 3/2015 | Irani | G06T 3/4053 345/660 |
| 9,846,228 | B2 | 12/2017 | Davis et al. | |
| 2016/0097853 | A1* | 4/2016 | Kamo | H01Q 1/32 342/70 |
| 2016/0334502 | A1* | 11/2016 | Ali | G01S 7/352 |
| 2017/0174227 | A1 | 6/2017 | Tatourian et al. | |
| 2017/0206434 | A1* | 7/2017 | Nariyambut Murali | G06K 9/6256 |

(Continued)

OTHER PUBLICATIONS

Park, Jong-Ilet et al., "A Comparative Study on ISAR Imaging Algorithms for Radar Target Identification", *Progress In Electromagnetics Research*, vol. 108, 2010 (pp. 155-175).

(Continued)

*Primary Examiner* — Peter M Bythrow
(74) *Attorney, Agent, or Firm* — NSIP Law

(57) ABSTRACT

A method of increasing a resolution of radar data is provided. The method of training a radar resolution increase model comprises generating a high-resolution training ground truth and a low-resolution training input from original raw radar data based on information corresponding to at least one of dimensions defining the original raw radar data, and training the resolution increase model based on the high-resolution training ground truth and the low-resolution training input. A radar data processing device generates high-resolution output data from low-resolution input data based on a trained resolution increase model.

22 Claims, 17 Drawing Sheets

(56) References Cited

U.S. PATENT DOCUMENTS

| | | | |
|---|---|---|---|
| 2019/0004535 A1 | 1/2019 | Huang et al. | |
| 2019/0080166 A1 | 3/2019 | Zhu et al. | |
| 2019/0258878 A1* | 8/2019 | Koivisto | G06V 20/584 |
| 2019/0384303 A1* | 12/2019 | Muller | G01C 21/3407 |
| 2020/0003886 A1* | 1/2020 | Cho | G01S 13/62 |
| 2020/0249314 A1* | 8/2020 | Eshet | G01S 13/931 |
| 2020/0265247 A1* | 8/2020 | Musk | G06T 7/70 |
| 2020/0301013 A1* | 9/2020 | Banerjee | G01S 13/867 |
| 2020/0355817 A1* | 11/2020 | Gillian | G01S 7/403 |
| 2020/0393558 A1* | 12/2020 | Orr | G01S 13/9027 |

OTHER PUBLICATIONS

Walha, Rim et al., "Multiple Learned Dictionaries Based Clustered Sparse Coding for the Super-Resolution of Single Text Image", *2013 12th International Conference on Document Analysis and Recognition*, 2013 (pp. 1-5).

Wu, Zeling et al., "Super-resolution Reconstruction of SAR Image based on Non-Local Means Denoising Combined with BP Neural Network", *arXiv preprint arXiv:1612.04755*, 2016 (pp. 1-6).

Deng, Cheng et al., "Similarity Constraints-Sased Structured Output Regression Machine: An Approach to Image Super-Resolution", *IEEE Transactions on Neural Networks and Learning Systems*, vol. 27, Issue 2, Dec. 2016 (pp. 2472-2485).

Ledig, Christian, et al. "Photo-realistic single image super-resolution using a generative adversarial network." *Proceedings of the IEEE conference on computer vision and pattern recognition*. 2017 (pp. 4681-4690).

Abdulatif, Sherif, et al. "An Adversarial Super-Resolution Remedy for Radar Design Trade-offs." *arXiv preprint arXiv:1903.01392*, Jun. 20, 2019 (pp. 1-5).

\* cited by examiner

METHOD AND DEVICE WITH IMPROVED RADAR RESOLUTION

CROSS-REFERENCE TO RELATED APPLICATION

This application claims the benefit under 35 USC § 119(a) of Korean Patent Application No. 10-2019-0073012 filed on Jun. 19, 2019, in the Korean Intellectual Property Office, the entire disclosure of which is incorporated herein by reference for all purposes.

BACKGROUND

1. Field

The following description relates to improving a resolution of a radar.

2. Description of Related Art

Advanced driver assistance systems (ADAS) are typically used to enhance safety and convenience for drivers by implementing sensors provided inside or outside a vehicle. The ADAS may assist the driver by detecting objects, and alerting the driver of hazardous road conditions.

The sensors used in the ADAS may include a camera, an infrared sensor, an ultrasonic sensor, a light detection and ranging (LiDAR), and a radio detection and ranging (radar). The radar may reliably measure objects around the vehicle without being affected by environmental conditions including, for example, weather, compared to optical sensors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method of training a radar resolution increase model, the method including receiving original raw radar data, generating a high-resolution training ground truth and a low-resolution training input from the original raw radar data based on information corresponding to at least one of dimensions defining the original raw radar data, and training the radar resolution increase model based on the low-resolution training input and the high-resolution training ground truth.

The dimensions defining the original raw radar data may include one of a Doppler velocity, a horizontal angle, an elevation angle, and a range, or a combination of two or more of the Doppler velocity, the horizontal angle, the elevation angle, and the range.

The generating of the high-resolution training ground truth and the low-resolution training input may include selecting low-resolution radar data from the original raw radar data, and generating the low-resolution training input by preprocessing the selected low-resolution radar data.

The selecting of the low-resolution radar data may include selecting, as the low-resolution radar data, radar data corresponding to a first part of antenna channels from the original raw radar data in an angular dimension.

The selecting of the low-resolution radar data may include selecting, as the low-resolution radar data, radar data corresponding to a portion of chirp signals implemented for single scanning from the original raw radar data in a Doppler velocity dimension.

The selecting of the low-resolution radar data may include selecting, as the low-resolution radar data, radar data corresponding to a first part of bandwidths allocated to the original raw radar data in a range dimension.

The generating of the low-resolution training input by preprocessing the selected low-resolution radar data may include performing a range fast Fourier transform (FFT) process and a digital beamforming (DBF) process on the selected low-resolution radar data.

The generating of the low-resolution training input by preprocessing the selected low-resolution radar data may include generating at least one of a range-Doppler map and a range-angle map from the low-resolution radar data.

The generating of the high-resolution training ground truth and the low-resolution training input may include selecting high-resolution radar data from the original raw radar data; and generating the high-resolution training ground truth by preprocessing the selected high-resolution radar data.

The radar resolution increase model may include a neural network, the neural network comprising a convolution layer, wherein the training of the radar resolution increase model may include further training the radar resolution increase model based on direction-of-arrival (DoA) information estimated based on subspace type-based estimation.

The resolution increase model may include a generator model and a discriminator model, wherein the training of the radar resolution increase model may include generating a temporary high-resolution output from the low-resolution training input based on the generator model, training the generator model and the discriminator model based on a result output by the discriminator model from the temporary high-resolution output, the high-resolution training ground truth, and DoA information estimated based on subspace type-based estimation; and in response to the training being completed, removing the discriminator model from the radar resolution increase model.

In a general aspect, a processor-implemented radar data processing method includes generating, by a radar sensor, raw radar data based on transmission of a radar signal by the sensor and reception of a radar signal by the sensor; and generating high-resolution output data from input data generated by preprocessing the generated raw radar data based on a trained radar resolution increase model. The generating of the high-resolution output data may include generating the input data by performing a range fast Fourier transform (FFT) process and a digital beamforming (DBF) process on the raw radar data.

The generating of the high-resolution output data may include generating, as the input data, one of a range-Doppler map and a range-angle map; and outputting, as the high-resolution output data, a map of a same type as a type of the input data from a map generated as the input data based on the resolution increase model.

The radar sensor may be implemented in a mobile terminal, wherein the generating of the raw radar data may include generating, by the radar sensor, the raw radar data by transmitting a radar signal to at least a portion of an object and receiving a radar signal reflected from the portion of the object, and the method may further include recognizing at least one of a gesture associated with the object or an identity of the object based on the high-resolution output data, and indicating a result of the recognizing.

The radar sensor may be implemented as a plurality of radar sensors in a vehicle, the method may further include transferring low-resolution raw radar data from the plurality of radar sensors to a central processor, generating, by the central processor, the high-resolution output data from the low-resolution raw radar data based on the radar resolution increase model, and generating driving-related information based on the generated high-resolution output data.

In a general aspect, a training device includes a memory configured to store a resolution increase model; and a processor configured to receive original raw radar data, and generate a high-resolution training ground truth and a low-resolution training input from the original raw radar data based on information corresponding to at least one of dimensions defining the original raw radar data, and train the resolution increase model such that the high-resolution training ground truth is output from the low-resolution training input.

In a general aspect, a processor-implemented training method includes transmitting, by a sensor, a radar signal to an object, receiving a reflection of the transmitted radar signal from the object, generating raw radar data from the received reflection of the transmitted radar signal, perform a high-resolution preprocessing operation on the raw radar data to generate a high-resolution training ground truth data, performing a low-resolution preprocessing operation on low-resolution radar data selected from the raw radar data to generate a low-resolution training input; and training a generator model and a discriminator model based on the low-resolution training input, the high-resolution training ground truth, and direction-of-arrival (DoA) information estimated based on subspace type-based estimation.

The high-resolution preprocessing operation may include one or more of a range fast Fourier transform (FFT) process, a digital beamforming (DBF) process, and a non-coherent integration process.

Other features and aspects will be apparent from the following detailed description, the drawings, and the claims.

Figure 1:
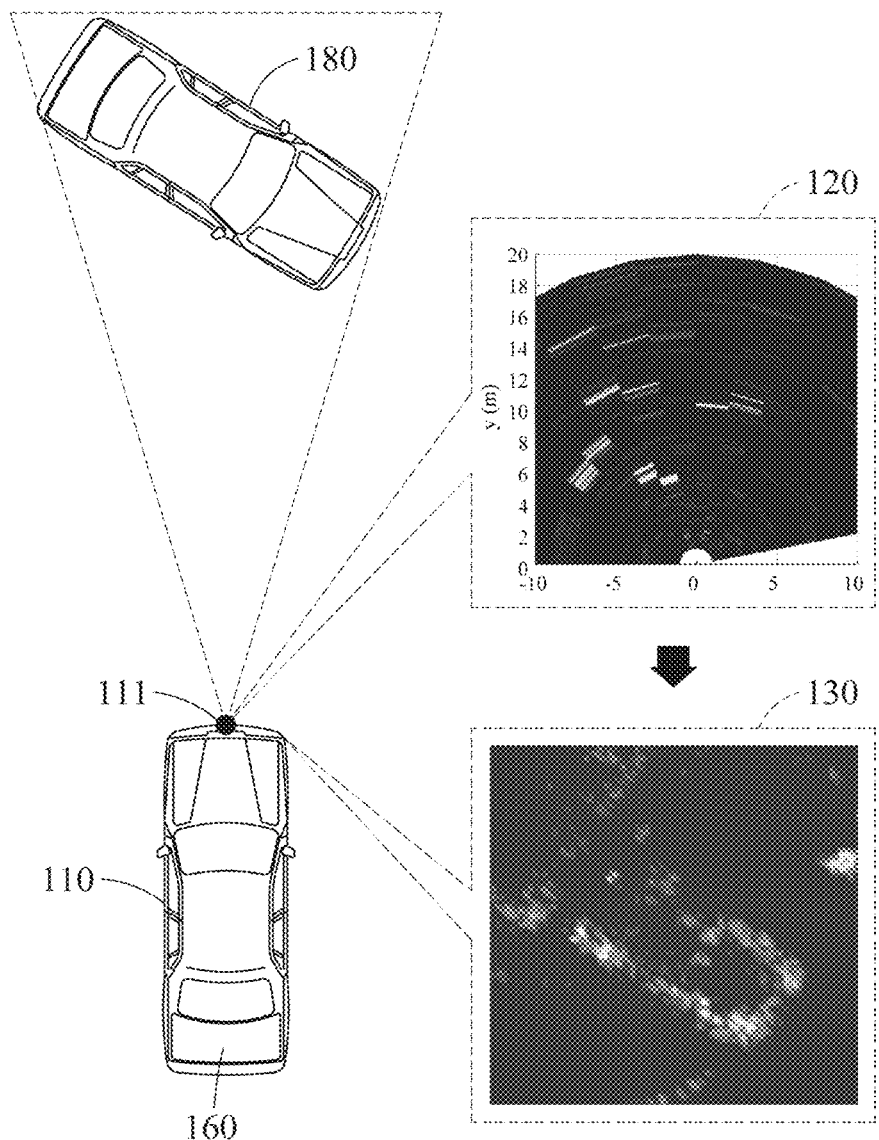
FIG. 1 illustrates an example of recognizing a surrounding environment through a radar data processing method, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of recognizing a surrounding environment through a radar data processing method, in accordance with one or more embodiments.

Referring to FIG. 1, in an example, a radar data processing device 110 may detect an object that is present in front of a vehicle 160 through the use of a sensor. The sensor may be configured to detect an object, and may be, for example, an image sensor and a radar sensor, and may detect a range to an object that is present in front of the vehicle. Although FIG. 1 illustrates that an object 180 in front of vehicle 160 may be detected, this is only an example, and objects behind the vehicle 160 may also be detected. The term "range" used herein may indicate a distance, for example, a range from A to B may indicate a distance from A to B, and a range between A and B may indicate a distance between A and B. The terms "range" and "distance" may thus be interchangeably used herein.

FIG. 1 illustrates an example where the sensor is a radar. In the example of FIG. 1, the radar data processing device 110 may analyze a radar signal received from a radar sensor 111, and detect a range to an object 180 that is present in front of the vehicle 160. The radar sensor 111 may be located inside or outside the radar data processing device 110. The radar data processing device 110 may detect the range to the object 180 present in front of the vehicle 160 based on data collected from another sensor, for example, an image sensor and the like, in addition to the radar signal received from the radar sensor 111.

The radar data processing device 110 may be provided in a vehicle 160. The vehicle 160 may perform adaptive cruise control (ACC), autonomous emergency braking (AEB), and blind spot detection (BSD), and the like based on a range to an object that is detected by the radar data processing device 110.

Further, the radar data processing device 110 may generate a map 130 of an environment therearound in addition to detecting a range. The map 130 may indicate locations of targets present around the radar data processing device 110, and such nearby targets may include dynamic objects such as vehicles and human beings, or stationary or background objects such as guardrails and traffic lights, as only examples.

To generate the map 130, single scanning techniques may be used. Through the single scanning, the radar data processing device 110 may obtain a single scan image 120 from a sensor, and generate the map 130 from the obtained single scan image 120. The single scan image 120 may be generated from a radar signal sensed by a single radar sensor 111, and may have a relatively low resolution. The single scan image 120 may be a radar scan image, and may include ranges indicated by radar signals received from an elevation angle by the radar sensor 111. For example, a horizontal axis of the single scan image 120 in the example of FIG. 1 indicates a steering angle of the radar sensor 111, and a vertical axis of the single scan image 120 indicates a range from the radar sensor 111 to a target. The format of a single scan image is not limited to that illustrated in FIG. 1, and may be represented by another format based on various examples. A two-dimensional (2D) image map such as a range-Doppler map and a range-angle map will be mainly described as the radar scan image. However, the radar scan image may be of a three-dimensional (3D) or higher-dimensional format such as a range-Doppler-angle map.

The steering angle may indicate an angle corresponding to a direction from the radar data processing device 110 towards a target point. For example, the steering angle is an angle between a driving direction of the radar data processing device 110 and the target point based on the radar data processing device 110, for example, the vehicle.

The radar data processing device 110 may obtain accurate information about a shape of a target through a multi-radar map. The multi-radar map may be generated by combining a plurality of radar scan images. For example, the radar data processing device 110 may generate the map 130 by spatiotemporally combining multiple radar scan images obtained as the radar sensor 111 moves. Herein, radar data may include raw radar data sensed by the radar sensor 111.

As described above, the radar data processing device 110 may generate a scan image by processing radar data, and generate driving-related information, for example, the map 130, or perform object recognition based on the generated scan image. Here, a high-resolution scan image may be needed to improve accuracy in generating the driving-related information and performing the object recognition. The term "resolution" used herein may indicate a measure of how detailed an image is represented, and a total pixel count in the image. The term "resolving power" used herein may indicate a capability of a device, for example, a sensor and a radar, to identify a small difference, for example, a capability to discriminate two objects located separately from each other. Thus, as a resolving power of a device decreases and is thus improved, a higher-resolution image may be obtained.

However, due to a limitation in terms of a cost for a radar sensor and the number of radar sensors that may be present in the vehicle, an amount of information of radar data that is obtainable by a single radar sensor may be restricted. Since the amount of information of radar data obtained by a single radar sensor may be restricted, the resolution of a scan image generated from the radar data may also be restricted. In this regard, a limitation of a resolving power of a radar sensor with respect to a Doppler velocity and a range will be described hereinafter with reference to FIGS. 2 and 3, and a limitation of an angular resolving power will be described with reference to FIG. 10. For such limitations of resolving power, a method may be used to increase a resolution of a radar scan image generated from radar data obtained by a radar sensor, and the method will be described with reference to FIGS. 6 through 17.

For example, in the radar field, super-resolution direction-of-arrival (DoA) methods may be used to estimate a noise subspace, and track a target signal based on corresponding information. Although an accurate peak value may be returned for a known number of objects, other components may not be readily expressed or represented compared to a discrete Fourier transform (DFT). In addition, such methods may be usable in all dimensions, although they may not generally be used in a dimension other than DoA. Hereinafter, a method of increasing a resolution of information corresponding to at least one dimension of radar data using a resolution increase model, for example, a neural network, will be described with reference to FIGS. 7 through 17.

Figure 2:
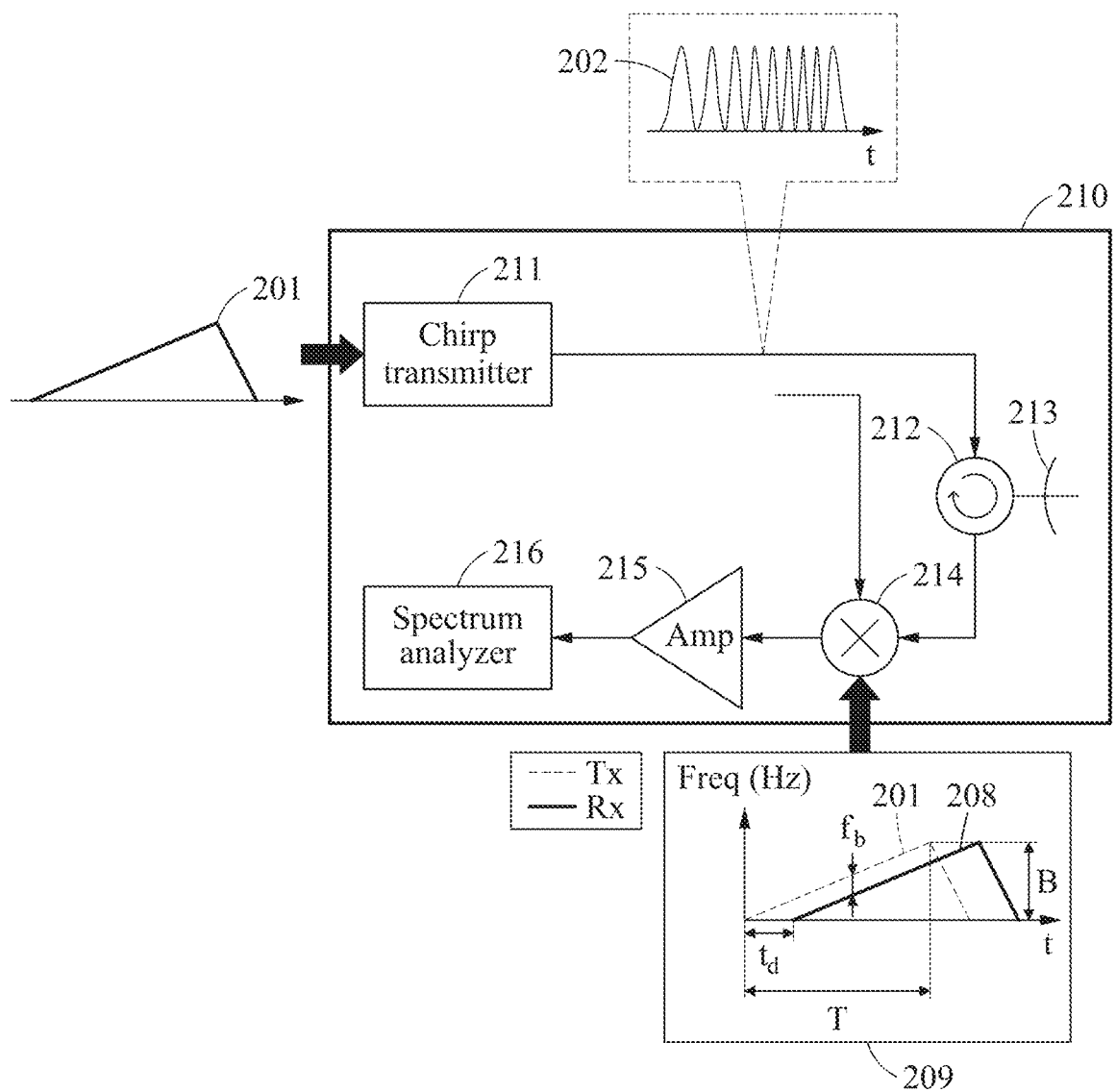
FIG. 2 illustrates an example of a radar sensor, in accordance with one or more embodiments.

FIG. 2 illustrates an example of a radar sensor, in accordance with one or more embodiments.

Referring to FIG. 2, a radar sensor 210 radiates a signal through an antenna 213 and receives a signal through the antenna 213. The signal radiated by the radar sensor 210 and the signal received by the radar sensor 210 may be referred to as radar signals. The radar sensor 210 may be, for example, a mmWave radar, and may estimate a range to an object by analyzing a time of flight (ToF), which is an amount of time used for a radiated electric wave to return after striking on an object, and may further estimate a change in signal waveform. The radar sensor 210 may be embodied as, for example, a frequency-modulated continuous-wave (FMCW) radar, but is not limited thereto. Herein, a radar is an acronym for radio detection and ranging.

A chirp transmitter 211 of the radar sensor 210 generates a frequency-modulated (FM) signal 202 of which a frequency changes over time. For example, the chirp transmitter 211 generates the FM signal 202 by performing frequency modulation on a chirp signal 201. The chirp signal 201 indicates a signal of which an amplitude increases or decreases linearly over time. The chirp transmitter 211 generates the FM signal 202 having a frequency corresponding to an amplitude of the chirp signal 201. For example, as illustrated in FIG. 2, the FM signal 202 has a waveform of which a frequency increases gradually in an interval in which an amplitude of the chirp signal 201 increases, and a waveform of which a frequency decreases gradually in an interval in which an amplitude of the chirp signal 201 decreases. The chirp transmitter 211 transmits the FM signal 202 to a duplexer 212.

The duplexer 212 of the radar sensor 210 may determine a transmission path (indicated by Tx in FIG. 2) and a reception path (indicated by Rx in FIG. 2) of a signal through the antenna 213. For example, while the radar sensor 210 is radiating the FM signal 202, the duplexer 212 forms a signal path from the chirp transmitter 211 to the antenna 213, and transmits the FM signal 202 to the antenna 213 through the formed signal path and then radiates the signal externally.

While the radar sensor 210 is receiving a signal reflected from an object, the duplexer 212 forms a signal path from the antenna 213 to a spectrum analyzer 216. The antenna 213 receives a reflected signal that is returned to the antenna after a radiated signal that is transmitted from the antenna arrives at an object or an obstacle, and is then reflected from the object or obstacle. The radar sensor 210 may transmit the reflected signal to the spectrum analyzer 216 through the signal path that is formed from the antenna 213 to the spectrum analyzer 216.

A frequency mixer 214 may demodulate a linear signal prior to the frequency modulation, for example, an original chirp signal, from a received signal. An amplifier 215 may amplify an amplitude of the demodulated linear signal.

The spectrum analyzer 216 may compare the radiated chirp signal 201 and a signal 208 that returns to the antenna after being reflected from an object. The spectrum analyzer 216 may detect a frequency difference between the radiated chirp signal 201 and the reflected signal 208.

Referring to a graph 209 illustrated in FIG. 2, the frequency difference between the radiated chirp signal 201 and the reflected signal 208 may be constant during an interval in which an amplitude of the radiated chirp signal 201 increases linearly along a time axis, and may be proportional to a range between the radar sensor 210 and an object from which the signal is reflected. Thus, the range between the radar sensor 210 and the object may be derived from the frequency difference between the radiated chirp signal 201 and the reflected signal 208. The spectrum analyzer 216 may transmit, to a processor of a radar data processing device, information obtained by the analyzing. The information to be transmitted to the processor may be generated from a radar signal, and is referred to herein as radar data. The radar data may include information consisting of dimensions, for example, a range, a horizontal angle, an elevation angle, and a radial velocity. A resolving power in calculating each of the dimensions of the radar data will be described hereinafter.

For example, the spectrum analyzer 216 may calculate a range between the radar sensor 210 and an object as represented by Equation 1 below.

$$R = \frac{cTf_b}{2B} \quad \text{Equation 1}$$

In Equation 1, R denotes the range between the radar sensor 210 and the object, and c denotes a velocity of light. T denotes a time length in an ascending interval of the radiated chirp signal 201. $f_b$ denotes a frequency difference between the radiated chirp signal 201 and the reflected signal 208 at a point in time in the ascending interval, and is also referred to as a beat frequency. B denotes a modulation bandwidth. The beat frequency $f_b$ may be derived as represented by Equation 2 below.

$$f_b = \frac{t_d B}{T} \quad \text{Equation 2}$$

In Equation 2, $f_b$ denotes the beat frequency. $t_d$ denotes a time difference, for example, a delay time, between a point in time at which the chirp signal 201 is radiated and a point in time at which the reflected signal 208 is received.

A range to be calculated from radar data is represented by Equation 1 above, and a range or distance resolving power to be calculated from radar data obtained by a radar sensor may be represented by Equation 3 below.

$$d_{res} = \frac{c}{2B} \quad \text{Equation 3}$$

In Equation 3, $d_{res}$ denotes a distance resolving power. c denotes a velocity of light. B denotes an allowable bandwidth for a radar sensor. The allowable bandwidth B may be the bandwidth that is stipulated in relevant rules or regulations in each country. For example, European Telecommunications Standards Institute (ETSI) and Federal Communications Commission (FCC) allow a 77 gigahertz (GHz) band for an automotive radar. A value of $d_{res}$ may decrease as a bandwidth increases as represented by Equation 3. Accordingly, the distance resolving power may be improved. However, an available bandwidth is restricted by relevant rules or regulations, and thus each radar sensor may have a limited resolving power that is restricted in terms of calculating a range or a distance from the sensor to the object.

Hereinafter, the manner in which a series of chirp signals is transmitted and received during one scanning, and the manner in which a Doppler velocity resolving power is restricted will be described with reference to FIG. 3.

Figure 3:
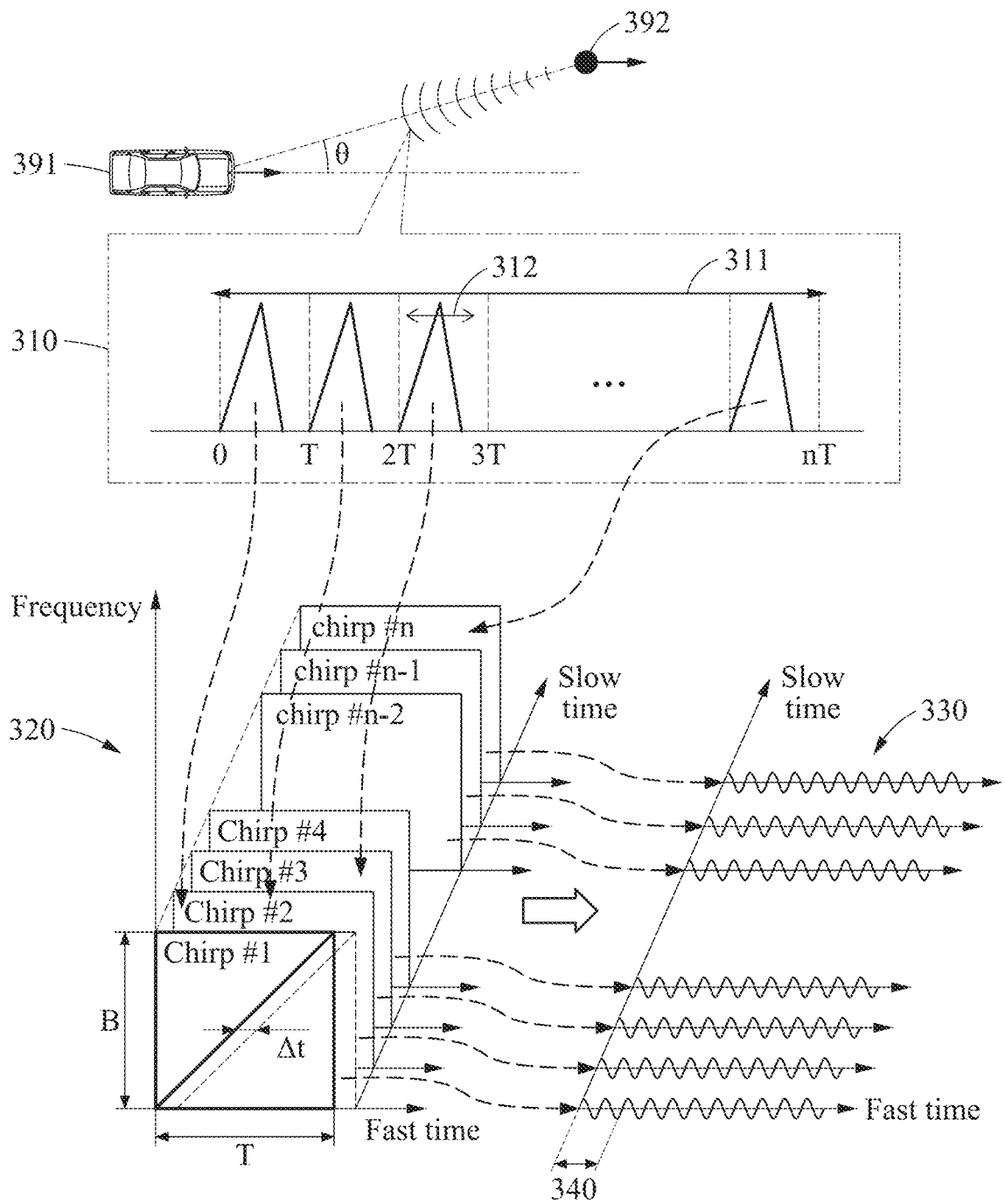
FIG. 3 illustrates an example of a chirp signal obtained through scanning by a radar sensor, in accordance with one or more embodiments.

FIG. 3 illustrates an example of a chirp signal obtained through scanning by a radar sensor, in accordance with one or more embodiments.

FIG. 3 illustrates an example of a manner in which a radar data processing device, which is embodied by a vehicle 391, senses a radar signal 310 that is reflected from a target point 392. The radar signal 310, corresponding to single scanning 311, may include a plurality of chirp signals. For example, each chirp signal 312 has a period T, and the radar signal 310 corresponding to the single scanning 311 includes n chirp signals. A radar sensor radiates the n chirp signals during the single scanning 311, and senses the n chirp signals. Thus, a time length of the radar signal 310 corresponding to the single scanning 311 is nT in which n denotes an integer greater than or equal to 1. Since chirp signals may be radiated by a unit of microseconds (μs) or milliseconds (ms), a velocity of targets on a fast time axis may be assumed to be a constant.

The chirp signals included in the radar signal 310 are represented by a graph 320 with a fast time axis, a slow time axis, and a frequency axis, as illustrated in FIG. 3. The slow time axis indicates a time axis classified by the chirp signals, and the fast time axis indicates a time axis on which a frequency of each chirp signal 312 changes. When each chirp signal 312 is represented as a beat signal waveform 330, a phase 340 may change for each chirp signal 312 as illustrated in FIG. 3. In an example, a radar data processing device may calculate a relative velocity as driving-related information based on such a change in the phase 340.

For example, the relative velocity may be a Doppler velocity which is a radial velocity from a target point towards the radar sensor. A Doppler velocity resolving power to be calculated from radar data obtained by the radar sensor may be represented as Equation 4.

$$v_{res} = \frac{\lambda}{2T_f} \quad \text{[Equation 4]}$$

In Equation 4, $v_{res}$ denotes a Doppler velocity resolving power, and λ denotes a wavelength of a band used by the radar sensor. $T_f$ denotes a time length of a radar signal corresponding to single scanning, as a frame time given for a series of chirp signals. When a period of each chirp is T and n chirp signals are transmitted and received during the single scanning, the frame time $T_f$ is nT. As represented by Equation 4, when the frame time $T_f$ increases, the Doppler velocity resolving power $v_{res}$ decreases and is thereby improved. However, when the period given for each chirp signal increases, a measurable maximum velocity decreases, and thus an allowable time for the single scanning in real-time operations may be exceeded. That is, by increasing the number of chirp signals to be used for the single scanning, a trade-off issue may occur, and thus an amount of data to be transmitted and an operation time may increase. Thus, each radar sensor may have a limited resolving power in terms of calculating a Doppler velocity.

In addition, although to be described with reference to FIG. 10, an angular resolving power may be inversely proportional to the number of virtual antennas of the radar sensor. Thus, as the number of virtual antennas increases, the angular resolving power may decrease and may thus be improved accordingly. The number of virtual antennas may correspond to a value obtained by multiplying the number of transmitting antennas of the radar sensor and the number of receiving antennas of the radar sensor together. To improve the angular resolving power, the number of actual physical transmitting antennas and receiving antennas should be increased. Thus, the number of radio frequency integrated circuits (RFICs) for controlling the antennas may increase and the number of antennas to be physically arranged may also increase, and thus the size of the radar sensor may increase.

In an example, a plurality of radar sensors may be provided in a plurality of portions of the vehicle 391, and the radar data processing device may calculate a range to a target point in all directions of the vehicle 391, a direction (e.g., steering angle), and a relative velocity based on information sensed by the radar sensors as described above.

For example, when the radar data processing device is provided in the vehicle 391, the vehicle 391 may provide various functions for driving, for example, adaptive cruise control (ACC), blind spot detection (BSD), a lane change assist (LCA), and the like, using information obtained based on the information collected by the radar sensors. Hereinafter, examples of radar scan images generated as driving-related information will be described with reference to FIGS. 4 and 5.

Figure 4:
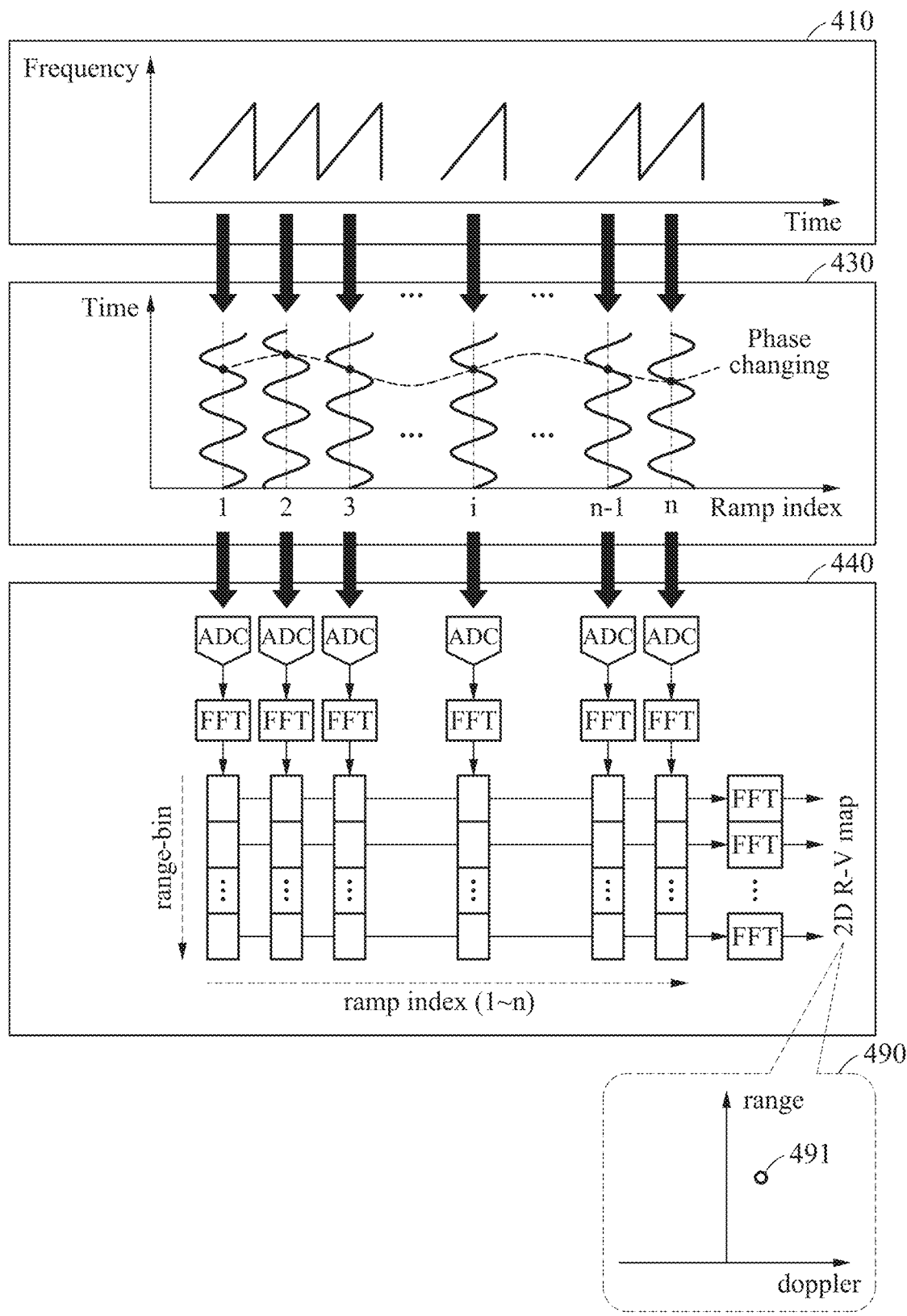
FIGS. 4 and 5 illustrate an example of radar scanning, and a radar scan image, in accordance with one or more embodiments.
Figure 5:
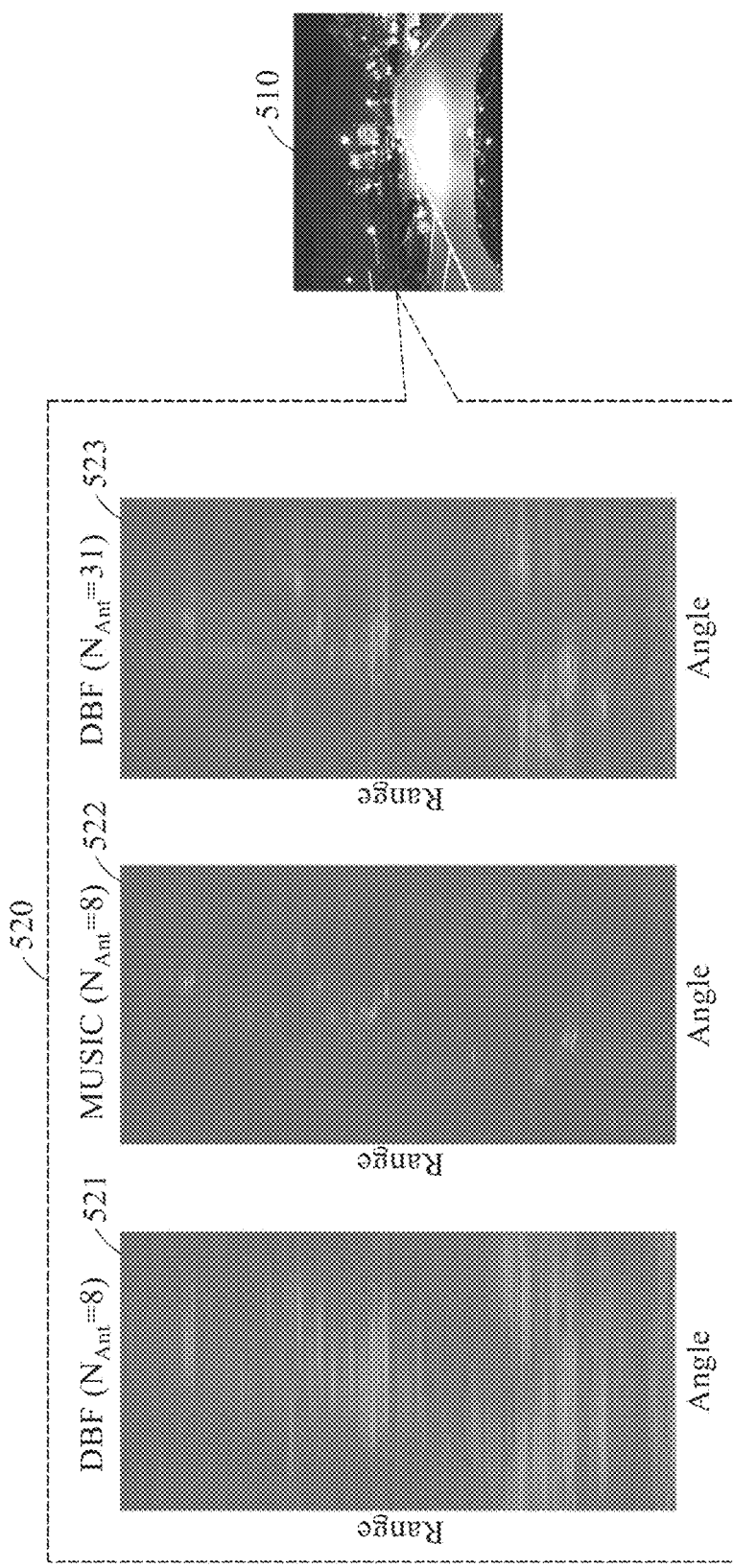

FIGS. 4 and 5 illustrate an example of radar scanning, and a radar scan image.

In an example, radar data may consist of a plurality of dimensions including, for example, a range-related dimension, a horizontal angle-related dimension, an elevation angle-related dimension, and a radial velocity-related dimension. In this example, a horizontal angle and an elevation angle may not have a significant difference in increasing a resolution of a scanned image, and thus in discussing angles, the horizontal angle will be mainly described. In addition, dimensions of radar data are not limited to three dimensions—a range dimension, an angular dimension, and a radial velocity dimension.

The range dimension may indicate a change in frequency of a chirp signal. The frequency change of the chirp signal may indicate information on a fast time axis, and a range between a radar sensor and an object may be calculated from a frequency difference between a transmitted signal and a received signal in the radar sensor. As described above, a range or distance resolving power may be inversely proportional to a bandwidth swept by a chirp signal. That is, as the bandwidth increases, the distance resolving power may be improved.

The angular dimension may indicate a change in virtual antennas. For example, the radar sensor may use a plane wave, and may be provided in a structure of a uniform linear array (ULA). In this example, a radar signal transmitted from a transmitting antenna may be received by a plurality of receiving antennas. Neighboring receiving antennas may be disposed separately from each other at intervals of $\Delta d$, and thus the receiving antennas may receive signals having different phases in response to the signal radiated from the same transmitting antenna. Based on such a phase difference, a radar data processing device may estimate a direction-of-arrival (DoA). When estimating a DoA through digital beamforming (DBF) which is a relatively simple method, the angular resolving power may be inversely proportional to the number of virtual antennas. That is, the angular resolving power may be improved as the number of virtual antennas increases, and a level of accuracy in estimating the DoA may increase. The number of virtual antennas may correspond to a value obtained by multiplying the number of transmitting antennas and the number of receiving antennas together.

The radial velocity dimension may indicate information associated with a change among a plurality of chirp signals. For example, when an object moves, a plurality of chirp signals to be successively reflected and received from the object may change in phase, and information associated with such phase change of the chirp signals may be used to estimate a radial velocity of the object. When periods of chirp signals are the same, a velocity resolving power may be improved in radar data as a greater number of chirp signals are used for signal scanning.

In an example, a radar scan image map may indicate information corresponding to a portion of dimensions of radar data. FIG. 4 illustrates a range-Doppler map 490 as an example of the radar scan image map.

In the example of FIG. 4, a plurality of chirp signals 410 is indicated by a beat signal waveform 430. The radar data processing device generates the range-Doppler map 490 by preprocessing the beat signal waveform 430 in operation 440 as illustrated in FIG. 4. Operation 440 of the preprocessing may include an analog-to-digital conversion (ADC) for each index i based on a slow time axis, a fast Fourier transform (FFT) for each index i, and an FFT for each range-bin. A horizontal axis of the range-Doppler map 490 indicates a Doppler velocity, or a radial velocity, and a vertical axis of the range-Doppler map 490 indicates a range. Thus, the range-Doppler map 490 indicates a Doppler velocity of a target 491 and a range from the radar sensor to the target 491. The radar scan image is not limited to the illustrated example of FIG. 4.

FIG. 5 illustrates a range-angle map 520 as an example of the radar scan image map. Referring to FIG. 5, the radar sensor generates radar data by receiving a radar signal from a view 510. The radar data is represented as the range-angle map 520 as illustrated in FIG. 5. The range-angle map 520 may be derived by various algorithms. For example, a first range-angle map 521 is derived through DBF from radar data sensed through eight antennas, for example, $N_{ANT}=8$. A second range-angle map 522 is derived through multiple signal classification (MUSIC) from radar data sensed through eight antennas. A third range-angle map 523 is derived through DBF from radar data sensed through 31 antennas. When the same number of antennas is given, for example, $N_{ANT}=8$, the second range-angle map 522 derived through the MUSIC may have a relatively higher resolution.

In an example, the radar data processing device may increase a resolution of a result, for example, a radar scan image, which is obtained by preprocessing radar data using a resolution increase model. In the example, as the resolution increase model, a neural network may be used, and the neural network used as the resolution increase model will be described hereinafter with reference to FIGS. 6 and 15. In addition, a device for training such resolution increase model is referred to herein as a training device.

Figure 6:
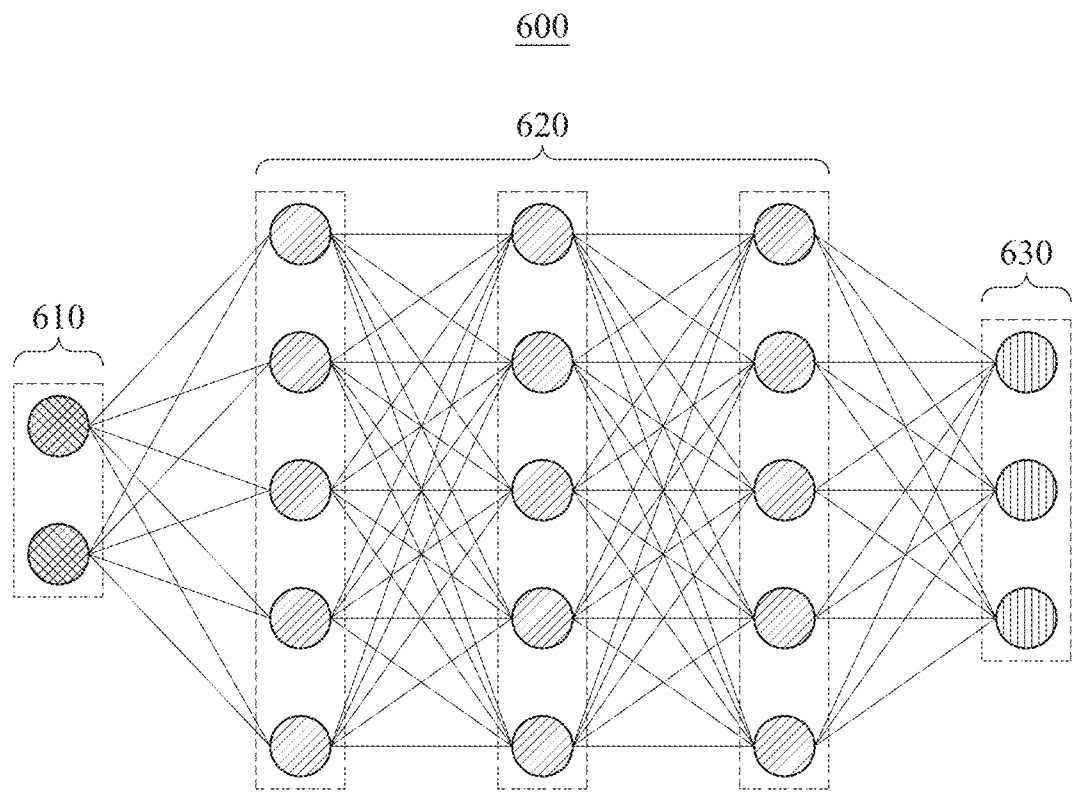
FIG. 6 illustrates an example of an architecture of a resolution increase model, in accordance with one or more embodiments.

FIG. 6 is a diagram illustrating an example of an architecture of a resolution increase model.

In an example, a resolution increase model may be designed to increase a resolution of a radar scan image, and be of an architecture for machine learning and include a neural network 600 as illustrated. The resolution increase model may be designed to output data having a second resolution from input data having a first resolution. The second resolution may be higher than the first resolution. Thus, the second resolution may also be referred to herein as a high resolution, and the first resolution may also be referred to herein as a low resolution. In addition, the input data of the first resolution may indicate low-resolution input data, and the output data of the second resolution may indicate high-resolution output data.

The neural network 600 may be an example of a deep neural network (DNN), as a non-limiting example. In such an example, the DNN may be one or more of a fully connected network, a deep convolutional network (DCN), and/or a recurrent natural network (RNN), or may include different or overlapping neural network portions respectively with such full, convolutional, or recurrent connections. The neural network 600 may increase a resolution of an image by mapping input data and output data that are in a nonlinear relationship based on deep learning. The deep learning is one of machine learning methods that processes an image from a bigdata set. The deep learning may be implemented by mapping of input data and the output data through supervised or unsupervised learning or training, such that when trained the resultant machine learning model, engine, or example NN may intuitively map further input data to output data with a desired accuracy or reliability.

Referring to FIG. 6, the example neural network 600 includes an input layer 610, hidden layers 620, and an output layer 630. Each of the input layer 610, the hidden layer 620, and the output layer 630 may respectively include a plurality of artificial nodes.

Although the hidden layer 620 is illustrated in FIG. 6 as including three layers for the convenience of description, the hidden layer 620 may include various numbers of layers. In addition, although the neural network 600 is illustrated in FIG. 6 as including a separate input layer, for example, the input layer 610, to receive input data, the input data may be input directly to the hidden layer 620. Artificial nodes of each of the layers of the neural network 600, excluding the output layer 630, may be connected to artificial nodes of a subsequent layer through links to transmit an output signal. The number of the links may correspond to the number of artificial nodes included in the subsequent layer. The links may be referred to as connections or connection weights.

During training and implementation such connections and connection weights may be selectively implemented, removed, and varied to generate or obtain a resultant neural network that is thereby trained and that may be correspondingly implemented for the trained objective, such as for any of the above example recognition objectives.

To each of artificial nodes included in the hidden layer 620, an output of an activation function associated with weighted inputs of artificial nodes included in a previous layer may be input. Here, a weighted input is a product of a multiplication between an input of an artificial node included in the previous layer and a weight. The weight may also be referred to as a parameter of the neural network 600, and connection weights of a layer or between layers, or of portions or of the whole, of the neural network 600 may be referred to as parameters of the neural network 600, as non-limiting examples. Here, although the connection weighted inputs will be discussed herein as being weighted inputs provided by a connection from a node of a previous layer, it is noted that examples are not limited thereto. For example, depending on the architecture of the node and/or the layer or neural network there may be recurrent connections where an output of a current node is fed back to the same node at a subsequent time, or there may be other memory, bias, or contextual connections that may or may not be weighted and may be based on, or independent from, the previous layer or may be connections from other subsequent layers, other neural network portions or neural networks, or one or more further previous layers. An activation function may be any one of, for example, a sigmoid, a hyperbolic tangent (tan h), and a rectified linear unit (ReLU), as non-limiting examples, and such activation function may be used to form or impart a nonlinearity of or to the neural network 600. There may be different activation functions used in different layers, such as where the activation functions may be varied during optimization, resulting in different activation functions for different layers. As a non-limiting example, the same activation function may be respectively implemented by all nodes of a particular layer, or for all nodes of the hidden layers, as non-limiting examples. To each of artificial nodes included in the output layer 630, weighted inputs of artificial nodes included in a previous layer, for example, a final hidden layer, may be output to, or input by, each of artificial nodes included in the output layer 630. Here, a process in which weighted data is input from a layer to a layer subsequent to the layer may be referred to as propagation. The neural network 600 may include a convolution layer configured for convolution filtering. For example, a device, for example, a radar data processing device, may propagate information from a previous layer to a convolution layer, and perform convolution filtering on the propagated information, and then propagate a result of the convolution filtering to a subsequent layer.

Although the neural network 600 is described above as an example of a resolution increase model, the resolution increase model is not limited to the neural network 600.

For example, in a general technical field of image processing, a camera which may be a passive sensor configured to simply record a signal that enters through a lens after light is reflected by an object, and may simply down-sample an image without an additional process for image processing on a width or a height of the image. This is because pixel sizes of a camera sensor may be almost the same in a width and a height, and thus pixels may have a spatially similar correlation. Thus, an image obtained by the camera may be simply applicable to a convolutional neural network (CNN) which is configured to imitate motions of human visual cells to process an image. However, the same image processing as in the general image may not be readily applicable because radar data includes information defined by different dimensions from the general image, for example, a range, an angle, and a velocity, and a value of a location is indicated by a complex number.

Thus, to train the resolution increase model for radar data, a desirable low-resolution training input and a high-resolution training ground truth should be selected. Hereinafter, a method of selecting a low-resolution training input and a high-resolution training ground truth from original data to train the resolution increase model will be described with reference to FIGS. 7 through 10.

Figure 7:
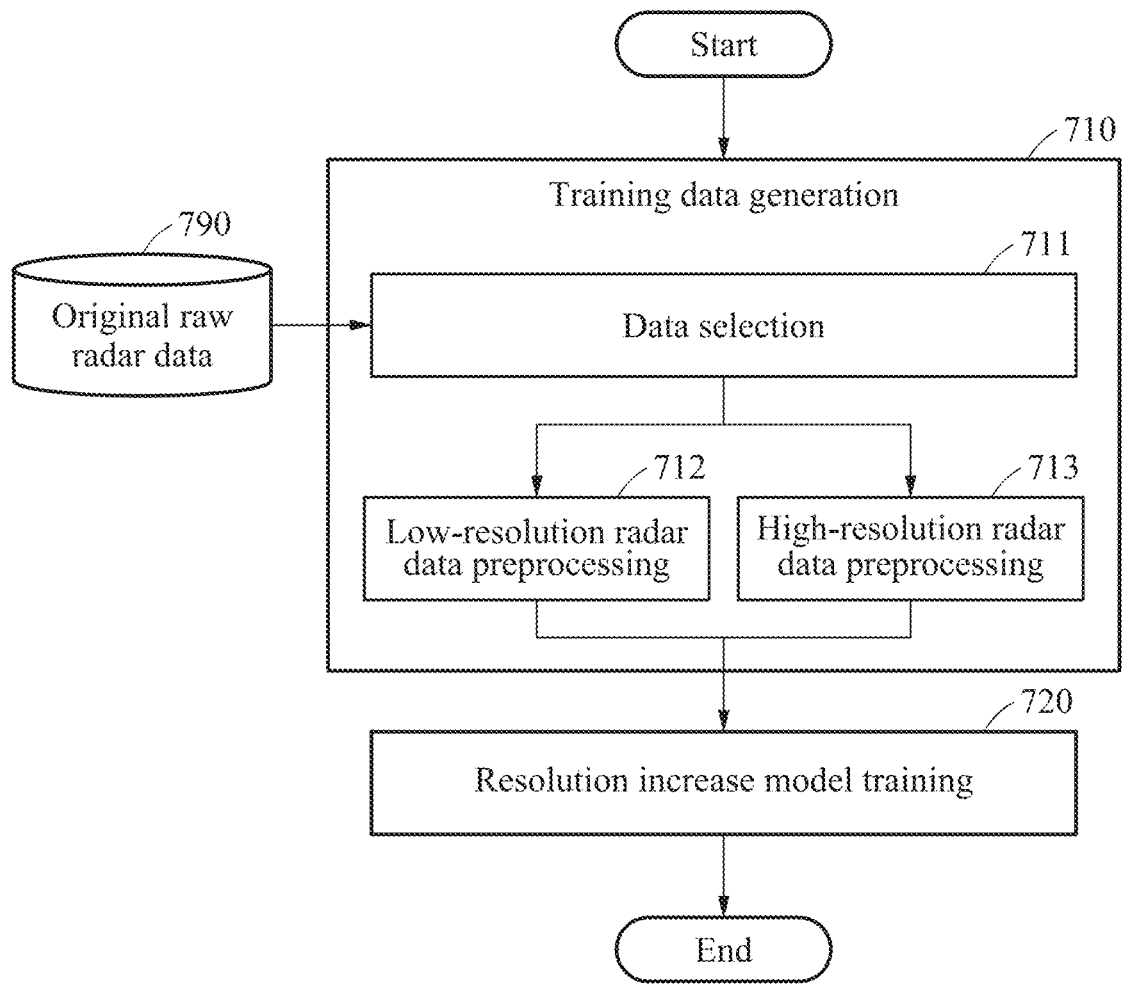
FIG. 7 illustrates an example of a method of training a radar resolution increase model, in accordance with one or more embodiments.

FIG. 7 illustrates an example of a method of training a radar resolution increase model.

Referring to FIG. 7, in operation 710, a training device generates training data from original raw radar data 790. The original raw radar data 790 is an original copy of raw radar data used for training. For example, the training device generates a low-resolution training input and a high-resolution training ground truth from the original raw radar data 790 based on information corresponding to at least one of dimensions defining the original raw radar data 790. The training data includes a pair of the low-resolution training input and the high-resolution training ground truth. As described above, the dimensions defining or forming the original raw radar data 790 may include as examples one of a Doppler velocity, a horizontal angle, an elevation angle, and a range, or a combination of two or more of the Doppler velocity, the horizontal angle, the elevation angle, and the range.

In operation 711, the training device selects data from the original raw radar data 790. In an example, the training device selects low-resolution radar data and high-resolution radar data from the original raw radar data 790. The low-resolution radar data and the high-resolution radar data may be data selected from the original raw radar data 790 in terms of at least one of the dimensions described in the foregoing. However, the high-resolution radar data may be the original raw radar data 790 itself. The low-resolution radar data may be data having a lower resolution and a degraded resolving power, compared to the high-resolution radar data. The selecting of the low-resolution radar data and the high-resolution radar data will be described with reference to FIGS. 8 through 10.

In operation 712, the training device generates the low-resolution training input by preprocessing the selected low-resolution radar data. The low-resolution training input may be, for example, a radar scan image generated as a result of the preprocessing performed on the low-resolution radar data. For example, the training device may perform, on the selected low-resolution radar data, an FFT and DBF as an example of the preprocessing. However, the preprocessing is not limited to the FFT and the DBT. The training device may generate, as the low-resolution training input, at least one of a range-Doppler map or a range-angle map, from the low-resolution radar data through the preprocessing. Each of the range-Doppler map and the range-angle map may be one of types of radar scan image as described above.

In operation 713, the training device generates the high-resolution training ground truth by preprocessing the selected high-resolution radar data. The high-resolution training ground truth may be, for example, a radar scan image generated as a result of the preprocessing performed on the high-resolution radar data. In this operation, the training device may generate, as the high-resolution training ground truth, a same type of map as that of the radar scan image generated as the low-resolution training input. For example, when the low-resolution training input is of a range-Doppler map type, the high-resolution training ground truth may be generated to be of the range-Doppler map type.

In operation 720, the training device trains a resolution increase model. The training device trains the resolution increase model based on the low-resolution training input and the high-resolution training ground truth. For example, the training device may generate a temporary high-resolution output from the low-resolution training input based on a temporary resolution increase model. The temporary resolution increase model indicates the resolution increase model before the training is completed, and the temporary high-resolution output indicates an output of the resolution increase model before the training is completed. The training device calculates a loss between the temporary high-resolution output and the high-resolution training ground truth based on a predefined loss function, and trains the resolution increase model based on the calculated loss. For example, the training device updates a parameter of the resolution increase model through, for example, backpropagation such that the loss is minimized. However, the training is not limited to the example described in the foregoing, and various training methods may be applied.

In an example, through the resolution increase model trained by the training device, a radar data processing device may generate a high-resolution radar scan image from low-resolution raw radar data generated by a radar sensor. For example, the training device may select low-resolution radar data with a narrow bandwidth from original raw radar data, and select corresponding high-resolution radar data with a wide bandwidth. As described above, a bandwidth is related to a range resolving power, and thus the resolution increase model trained based on training data with a varying bandwidth may output a radar scan image having a resolution that is increased in a range dimension. However, examples are not limited to what has been described in the foregoing, and the training device may select low-resolution radar data corresponding to partial antenna data of the radar sensor, and high-resolution radar data corresponding to entire antenna data. In addition, the training device may select low-resolution radar data corresponding to at least a portion of chirp signals, and high-resolution radar data corresponding all the chirp signals. Such data selection is not limited to being performed in a single dimension, but may be performed with greater complexly in two or more dimensions.

A dimension for which a resolution should be improved may vary according to an application, and the manner in which such data selection and data preprocessing are to be performed may vary based on a dimension that a user desires to improve.

Figure 8:
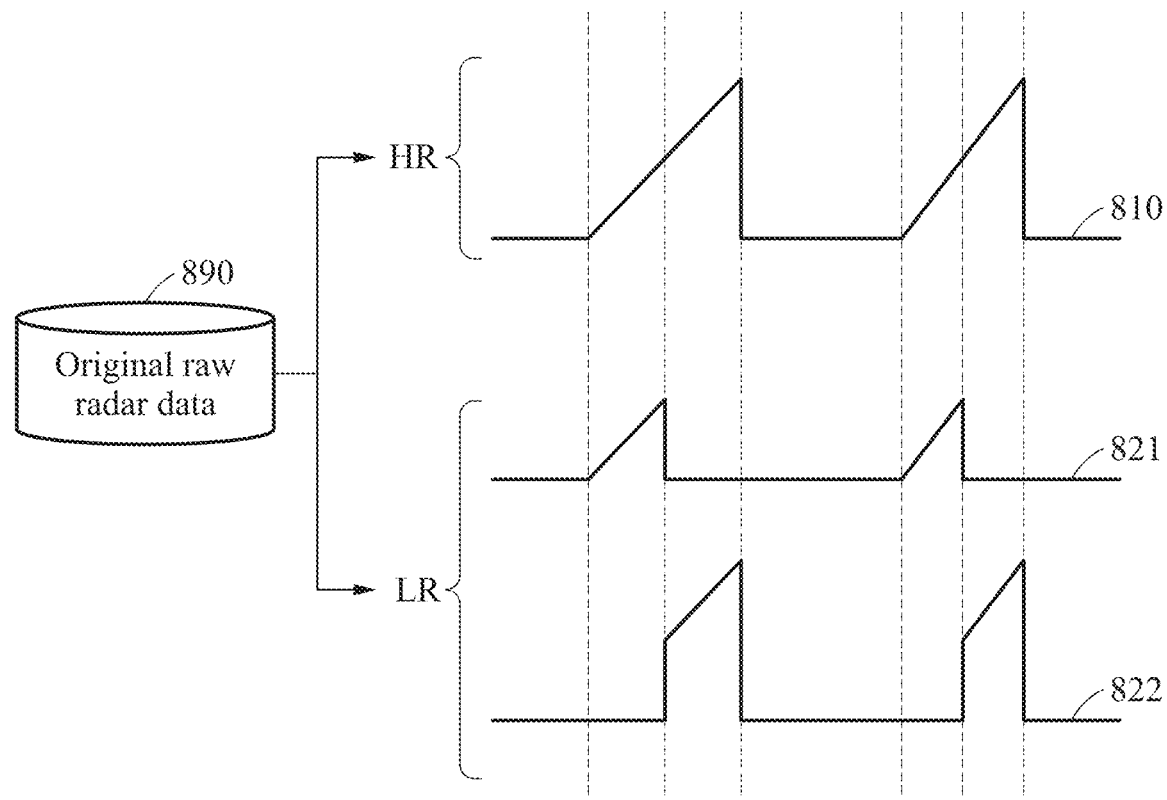
FIG. 8 illustrates an example of data selection in a range dimension, in accordance with one or more embodiments.

FIG. 8 illustrates an example of data selection in a range dimension, in accordance with one or more embodiments.

Referring to FIG. 8, a training device selects, as low-resolution radar data 821 and 822, radar data corresponding to a portion of bandwidths allocated to original raw radar data 890 in a range dimension. For example, the training device selects high-resolution radar data 810, and the low-resolution radar data 821 and 822 in a range dimension from the original raw radar data 890. In the example of FIG. 8, the high-resolution radar data 810 is the original raw radar data 890. The training device selects the low-resolution radar data 821 and 822 having a resolution decreased in a range dimension by decreasing a bandwidth swept by a chirp signal in the high-resolution radar data 810. As described above with reference to FIG. 3, a vertical axis of the chirp signal corresponds to a frequency, and the training device may restrict a frequency range and divide a single chirp signal into a plurality of signals. The signals may correspond to the low-resolution radar data 821 and 822, respectively.

Figure 9:
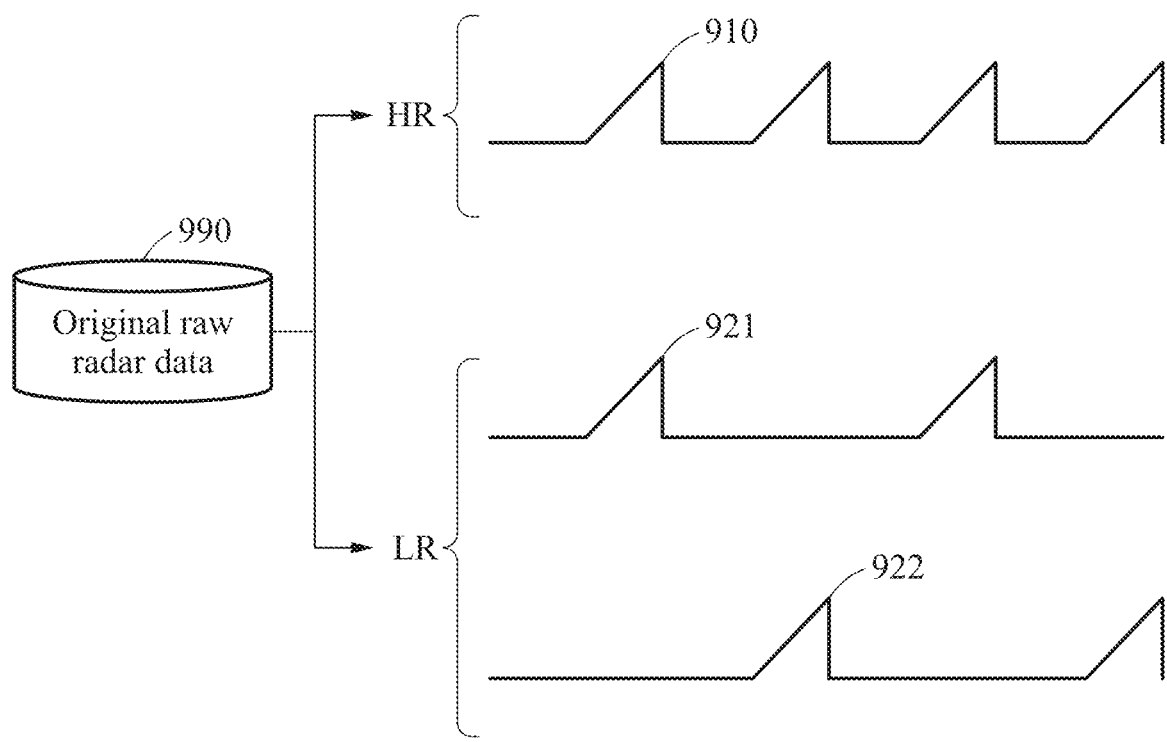
FIG. 9 illustrates an example of data selection in a radial velocity dimension, in accordance with one or more embodiments.

FIG. 9 illustrates an example of a data selection in a radial velocity dimension, in accordance with one or more embodiments.

Referring to FIG. 9, a training device selects, as low-resolution radar data 921 and 922 in a Doppler velocity dimension, radar data corresponding to a portion of chirp signals used for single scanning from original raw radar data 990. For example, the chirp signals used for single scanning may be numbered to be, for example, chirp 1, chirp 2, chirp 3, chirp 4, chirp 5, and chirp 6. In this example, data corresponding to chirp 1, chirp 3, and chirp 5 may be selected as low-resolution radar data, or alternately, data corresponding to chirp 2, chirp 4, and chirp 6 may be selected as the low-resolution radar data. However, examples are not limited to the example described in the foregoing, and data corresponding to chirp 1, chirp 2, and chirp 3 may be selected as low-resolution radar data, or data corresponding to chirp 4, chirp 5, and chirp 6 may be selected as low-resolution radar data.

The training device selects high-resolution radar data 910, and the low-resolution radar data 921 and 922, in a radial velocity dimension, from the original raw radar data 990. In the example of FIG. 9, the high-resolution radar data 910 is the original raw radar data 990. The training device selects the low-resolution radar data 921 and 922 having a resolution decreased in a velocity dimension by selecting a portion of the chirp signals used for single scanning from the high-resolution radar data 910.

Figure 10:
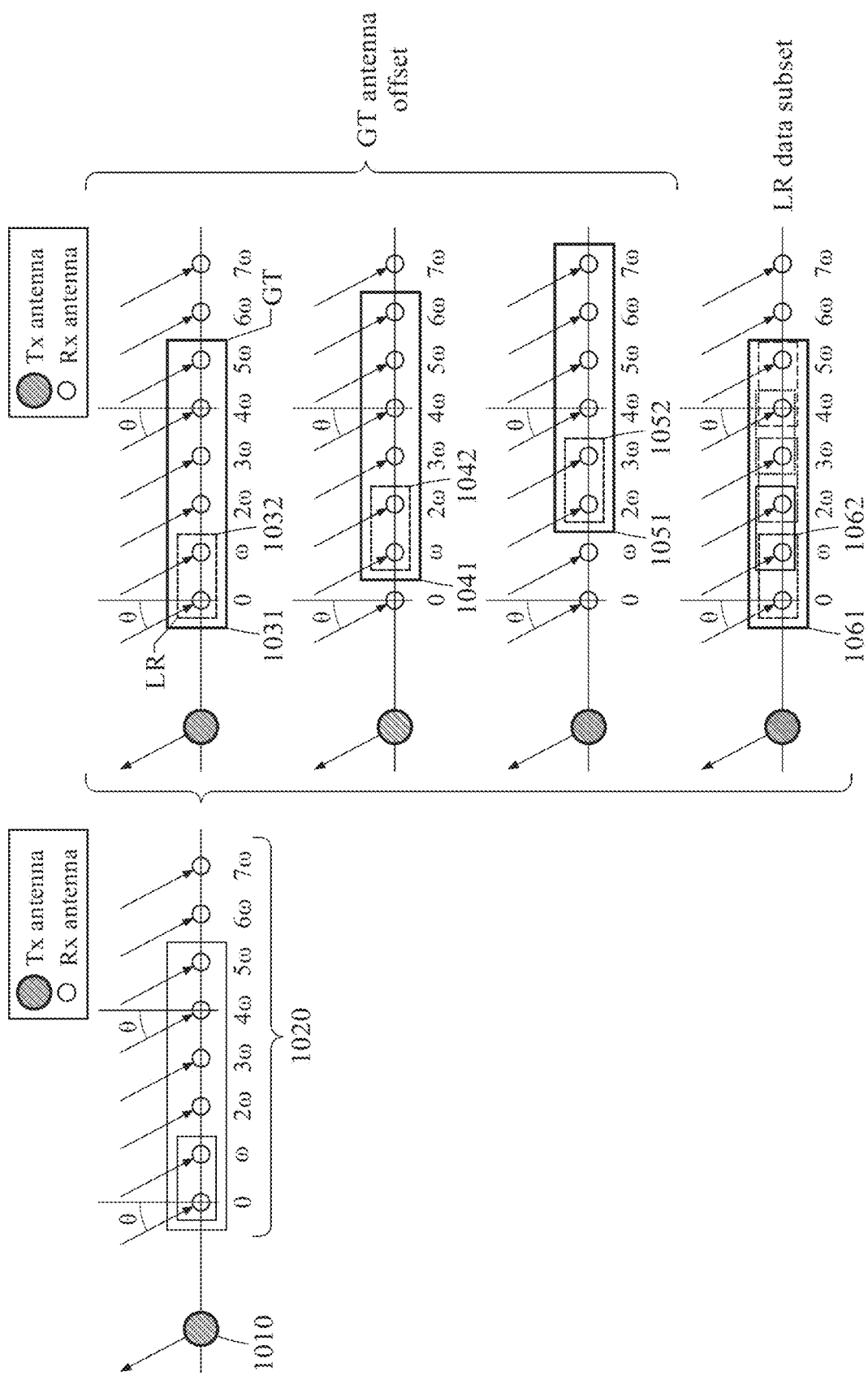
FIG. 10 illustrates an example of data selection in an angular dimension, in accordance with one or more embodiments.

FIG. 10 illustrates an example of a data selection in an angular dimension.

In an example, a training device may select, as low-resolution radar data, radar data corresponding to a portion of antenna channels from original raw radar data in an angular dimension.

Referring to FIG. 10, each radar sensor may include one or more transmitting antennas 1010 and one or more receiving antennas 1020. In a radar sensor, combinations of the transmitting antennas 1010 and the receiving antennas 1020 may operate as virtual antennas. For example, when the number of the transmitting antennas 1010 is $N_{TX}$ and the number of the receiving antennas 1020 is $N_{RX}$, the number N of the virtual antennas corresponds to a product obtained by multiplying $N_{TX}$ and $N_{RX}$ together. In such a structure of radar sensor, a resolution in an angular dimension may be represented by Equation 5 below.

$$\theta_{res} = \frac{\lambda}{Nd\cos\theta} \qquad \text{Equation 5}$$

In Equation 5, $\lambda$ denotes a wavelength used by a radar sensor, and N denotes the number of virtual antennas. d denotes a distance between the virtual antennas, and θ denotes a DoA. Although an angular resolving power may decreases, and is thus improved, as the number of virtual antennas increases, the number of virtual antennas to physically increase may be restricted. Hereinafter, an example of how a resolution in an angular dimension increases as the number of virtual antennas used for multiple-input and multiple-output (MIMO) decreases will be described.

In an example, the training device may select low-resolution radar data having a resolution reduced in an angular dimension by selecting antenna information from original raw radar data.

FIG. 10 illustrates a structure of a radar sensor of which eight receiving antennas 1020 receive a signal from a single transmitting antenna 1010. The training device selects, as high-resolution radar data, data corresponding to antennas belonging to a first receiving group 1031 among the receiving antennas 1020. The training device selects, as low-resolution radar data, data corresponding to antennas belonging to a subgroup 1032 of the first receiving group 1031. As described above with reference to Equation 5, an angular resolving power may be degraded as the number of antennas decreases, and thus a radar scan image generated from the data corresponding to the antennas belonging to the subgroup 1032 may have a lower angular resolution than a radar scan image generated from the data corresponding to the antennas belonging to the first receiving group 1031.

Similarly, the training device selects, as high-resolution radar data, data corresponding to antennas belonging to a second receiving group 1041 among the receiving antennas 1020, and selects, as low-resolution radar data, data corresponding to antennas belonging to a subgroup 1042 of the second receiving group 1041. A similar description is applicable to a third receiving group 1051 corresponding to selected high-resolution radar data, and a subgroup 1052, corresponding to low-resolution radar data, of the third receiving group 1051.

Further, using data corresponding to antennas belonging to subgroups 1062 of a fourth receiving group 1061, the training device selects sets of low-resolution radar data, the number of which corresponds to the number of the subgroups 1062.

The training device generates a training input by preprocessing low-resolution radar data, and generates a training output which is a ground truth (GT) by preprocessing the high-resolution radar data. The training output which is a ground truth may also be referred to herein as a high-resolution training ground truth, and, in an example, may be in a format of radar scan image. However, the format is not limited to a radar scan image, and various formats of data may be used.

After the data selection described above with reference to FIGS. 8 through 10, the low-resolution radar data and the high-resolution radar data may be preprocessed as described hereinafter.

For example, when radar data consists of three dimensions—range dimension, angular dimension, and radial velocity dimension, the training device may perform a general radar signal processing (RSP) operation based on each data dimension length to utilize information of all the three dimensions. The RSP operation converts raw radar data to data of a type that is interpretable by human beings through a range FFT, angle DBF, and a velocity FFT. When a desired format of high-resolution output data is a range-angle map or a range-Doppler map, the training device may perform, as a preprocessing operation on such high-resolution radar data, the RSP operation in two dimensions—a range dimension and an angular dimension for the range-angle map, and a range dimension and a radial velocity dimension for the range-Doppler map—corresponding to respective formats, and then perform a noncoherent integration on a dimension that is not used, to generate a high-resolution training ground truth having an improved signal-to-noise ratio (SNR). The generated high-resolution training ground truth may be used as a ground truth in a training process. Here, the training device generates a low-resolution training input by performing the RSP operation in two dimensions corresponding to respective formats as a preprocessing operation on low-resolution radar data.

For example, to generate a low-resolution training input and a high-resolution training ground truth in a range dimension, the training device may select, as low-resolution radar data, data of a portion of bandwidths swept by a radar. The training device may apply a range FFT to low-resolution radar data and high-resolution radar data that are selected through the preprocessing operation, and generate the low-resolution training input and the high-resolution training ground truth.

In another example, to generate a low-resolution training input and a high-resolution training ground truth in a radial velocity dimension, the training device may select, as low-resolution radar data, radar data corresponding to a portion of chirp signals used for single scanning. The training device may apply a velocity FFT as the preprocessing operation to the low-resolution radar data and high-resolution radar data that are selected as described above, and generate the low-resolution training input and the high-resolution training ground truth.

For reference, the training device may generate auxiliary information using a high-resolution method of another type different from a general FFT-based method for the preprocessing operation. For example, the training device may generate a training output having an improved signal-to-noise ratio (SNR) and a reduced dimension by performing a noncoherent integration or a similar operation on a dimension that is not concerned with a final output. Hereinafter, a manner in which the auxiliary information is generated will be described with reference to the example of angular dimension provided hereinafter.

In another example, in order to generate a low-resolution training input and a high-resolution training ground truth in an angular dimension, the training device may select, as low-resolution radar data, radar data corresponding to a portion of virtual MIMO antennas. In this example, when a radar sensor estimates a horizontal angle and an elevation angle individually, the data selection and the preprocessing operation may be performed individually on the horizontal angle and the elevation angle. The training device may generate the low-resolution training input through DBF as the preprocessing operation, and generate auxiliary information to ensure sensor reliability through subspace-based DoA estimation such as a MUSIC. The training device may generate the high-resolution training ground truth through DBF.

When defining, as Nr×Ns×Nv, a dimension of raw radar data in relation to the preprocessing operation in an angular dimension, Nr in a range dimension may be the number of ADC samples on a fast time axis, Ns in an angular dimension may be the number of virtual antennas, and Nv in a radial velocity dimension may be the number of chirp signals used for single scanning. The example of how to select low-resolution radar data corresponding to a portion of virtual antennas and select high-resolution radar data corresponding to all the antennas as a ground truth has been described with reference to FIG. 10. For example, the low-resolution radar data may be Nr×(Ns/4)×Nv. The training device may generate a low-resolution training input by applying a range FFT and DBF to the low-resolution radar data. By the range FFT and the DBF, high-resolution radar data of the dimension of Nr×Ns×Nv may be converted to data of a dimension of $Nr^{FFT} \times Ns^{FFT} \times Nv$. To generate a range-angle map having an improved angular resolution by a resolution increase model, the training device may apply a noncoherent integration to the data of the dimension of $Nr^{FFT} \times Ns^{FFT} \times Nv$ to generate a high-resolution training ground truth of a dimension of $Nr^{FFT} \times Ns^{FFT} \times 1$ with an improved SNR. The high-resolution training ground truth may be construed as being a range-angle map of a grayscale image format, and used as a ground truth in a training process.

Figure 11:
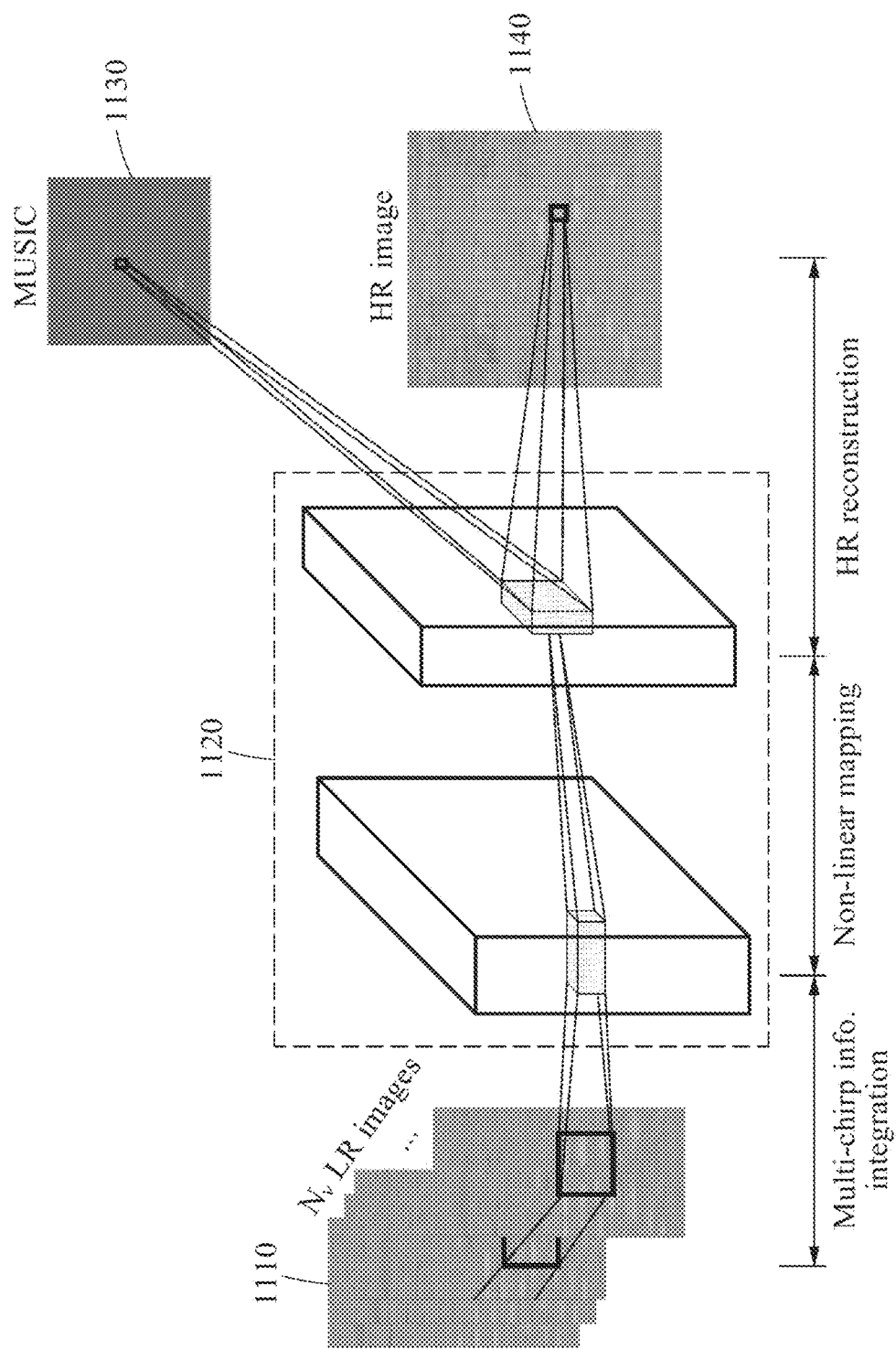
FIG. 11 illustrates an example of training a resolution increase model and increasing a resolution, in accordance with one or more embodiments.

FIG. 11 illustrates an example of training a resolution increase model and increasing a resolution, in accordance with one or more embodiments.

In an example, as described above with reference to FIGS. 8 through 10, a low-resolution training input 1110 and a high-resolution training ground truth 1140 are generated, and a resolution increase model 1120 may be embodied by a neural network including, for example, a convolution layer. For example, various network architectures, for example, a CNN, a very deep super-resolution network (VDSR), an enhanced deep super-resolution network (EDSR), a residual dense network (RDN), and a generative adversarial network (GAN), as non-limiting examples, may be used by being modified and changed to be suitable for radar data. A preprocessing operation and a neural network architecture that are applied to generate the low-resolution training input 1110 and the high-resolution training ground truth 1140 may change in terms of how preprocessing is to be performed and a point at which a network architecture changes according to a dimension that may improve a resolution.

For example, as illustrated in FIG. 11, a training device may stack a plurality of sheets of the low-resolution training input 1110, for example, low-resolution images, similar to color channels, and input the stacked images to the resolution increase model 1120. In this example, when the resolution increase model 1120 of a CNN architecture using two layers is implemented, the training device combines, or fuses, information of the low-resolution training input 1110, through multi-chirp in a first layer, extracts patches, and performs nonlinear mapping through a subsequent layer, and then reconstructs high-resolution output data from a result of the nonlinear mapping.

In addition, the training device may further use auxiliary information, in addition to the high-resolution training ground truth 1140, to improve training accuracy. In an example, the training device may train the resolution increase model 1120 based further on DoA information estimated based on subspace type-based estimation. For example, in the technical field of radar, a DoA estimation method may be broadly classified into a quadratic type-based method and the subspace type-based method. The quadratic type-based method may include, for example, a Bartlett method and a minimum variance distortionless response (MVDR). The subspace type-based method may include, for example, MUSIC and estimation of signal parameters via rotational invariant techniques (ESPRIT) that use eigendecomposition. The MUSIC is an eigenspace-based frequency estimation which generalizes Pisarenko harmonic decomposition. When a signal subspace dimension of the MUSIC is 1, the MUSIC may be the same as the Pisarenko method.

Compared to DBF, the methods such as the subspace-based MUSIC may have a high-resolution DoA estimation result with a relatively higher level of accuracy. For example, when a training output of training data is formed only with a DBF-based result and training is performed using a mean squared error (MSE) loss as a loss function, a result output from a trained model may be blurry. In the example of FIG. 11, the resolution increase model 1120 may output, as a training output in a training process, a result of performing the MUSIC along with a high-resolution radar image. Thus, as illustrated, the training device may output a temporary high-resolution output and a temporary MUSIC result 1130 from the low-resolution training input 1110 based on the resolution increase model 1120. Additionally, the training device may calculate a loss associated with the temporary high-resolution output and the temporary MUSIC result 1130 using the high-resolution training ground truth 1140 and a ground truth MUSIC that are generated as described above with reference to FIGS. 8 through 10. When the resolution increase model 1120 is trained to minimize the calculated loss, the resolution increase model 1120 outputs a result with a limited blurry level. That is, the training device may secure reliability using such MUSIC result as the auxiliary information. When the training is completed, a node or layer configured to output the auxiliary information such as the MUSIC result may be removed from the resolution increase model 1120. Thus, the resolution increase model 1120 completed with the training may generate only high-resolution output data from low-resolution input data.

Such MUSIC result may be generated from high-resolution radar data, but is not limited thereto. The MUSIC result may also be generated from low-resolution radar data.

Figure 12:
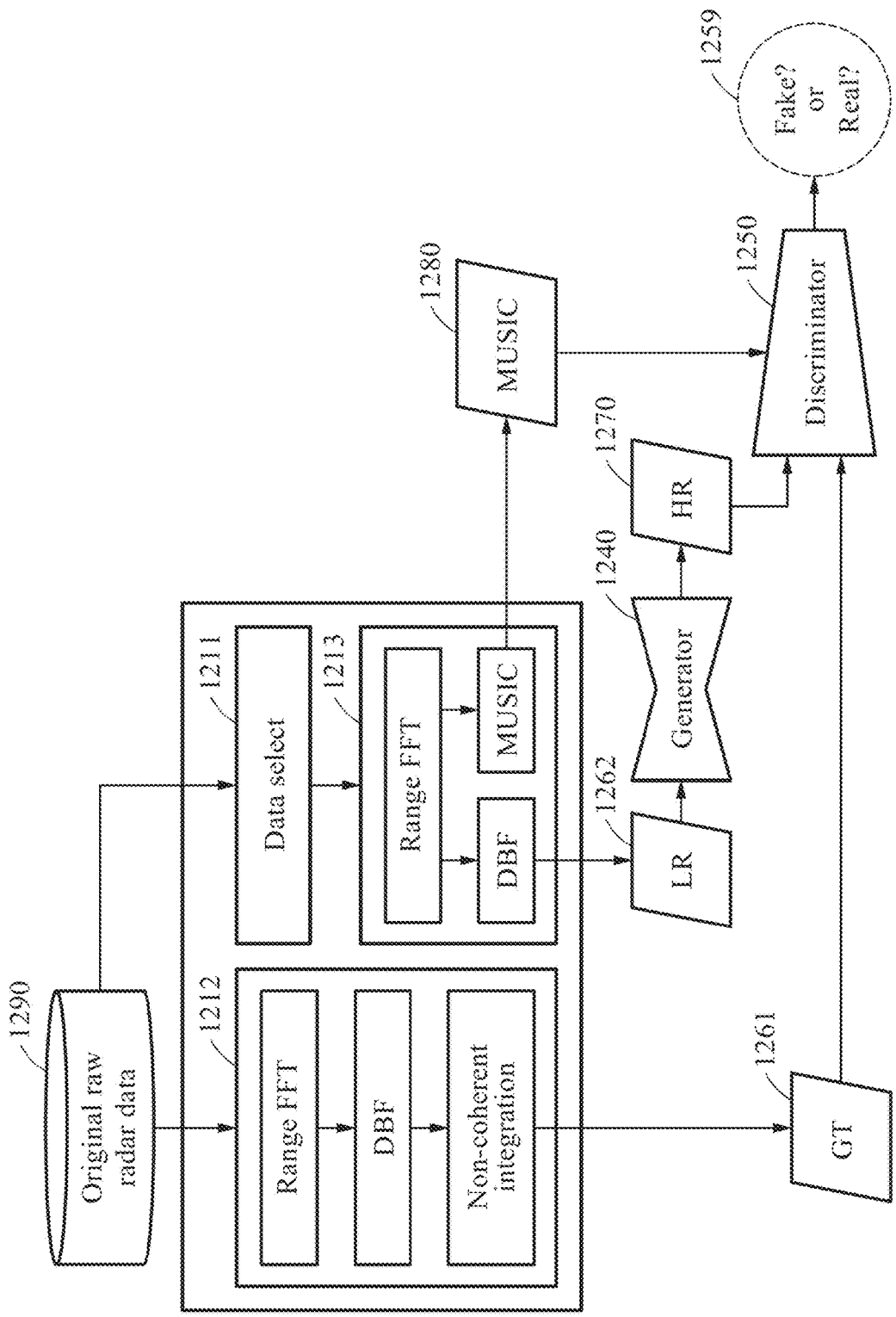
FIGS. 12 and 13 illustrate an example of a resolution increase model of a generative adversarial network (GAN) architecture, in accordance with one or more embodiments.
Figure 13:
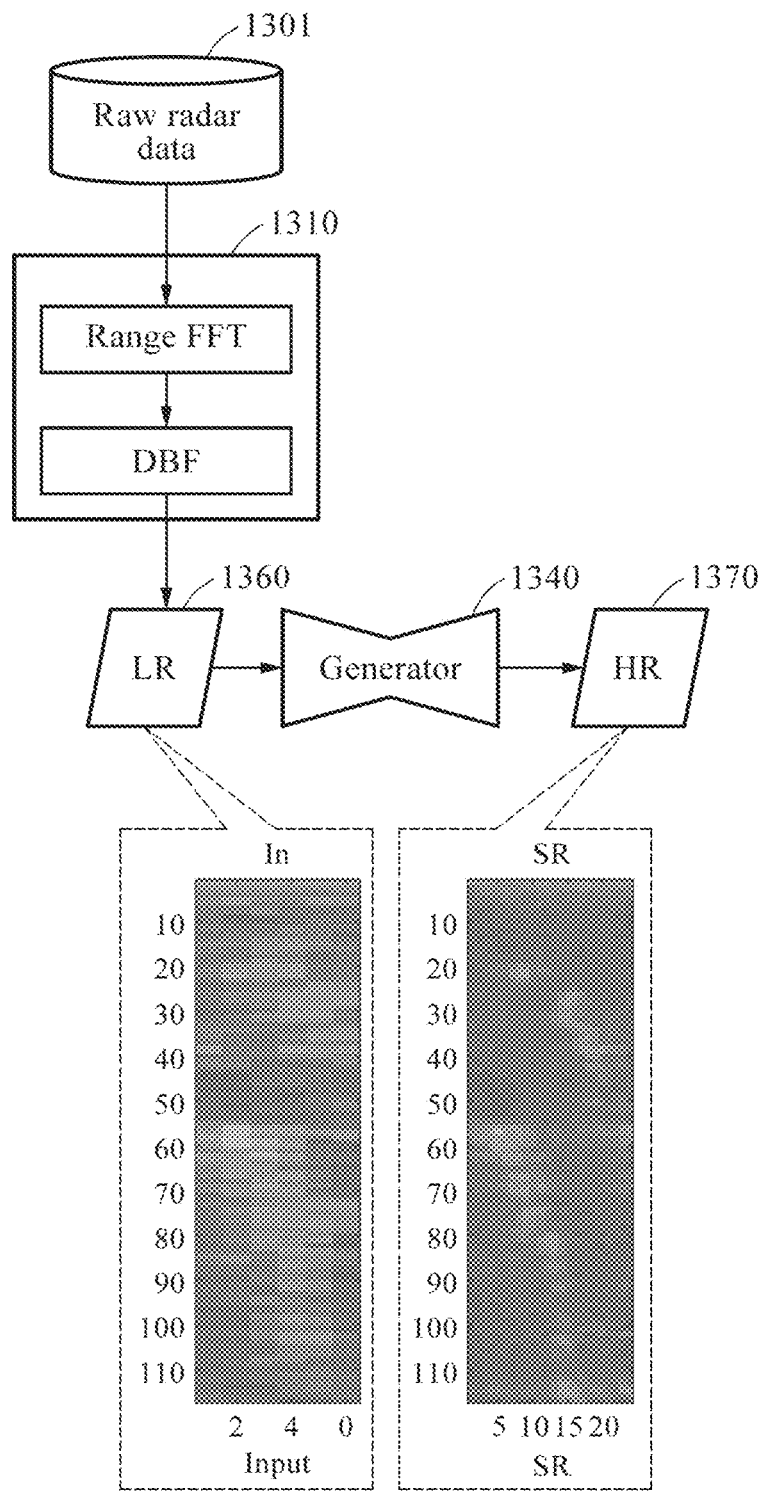

FIGS. 12 and 13 illustrate an example of a resolution increase model of a generative adversarial network (GAN) architecture, in accordance with one or more embodiments.

A GAN may output a realistic image as a result due to a characteristic of its architecture and an adversarial loss. However, a resolution increase model of such GAN architecture may select one from manifolds that may be output and generate an output that may fool a discriminator. Thus, it may only generate a plausible high-resolution output, but not ensure reliability of the high-resolution output. However, reliability may be an important factor for sensors, and thus a method that may ensure reliability may be needed in the GAN architecture.

In an example, the resolution increase model may be of such GAN architecture, and may include a generator model and a discriminator model. The generator model may generate candidates, while the discriminator model may evaluate or distinguish candidates produced by the generator model.

FIG. 12 illustrates an example of a training process of the resolution increase model of the GAN architecture, and FIG. 13 illustrates an example of a high-resolution data output generated using the resolution increase model after training is completed.

Referring to FIG. 12, a training device generates training data from original raw radar data 1290. For example, the training device selects the original raw radar data 1290 itself as high-resolution radar data, and performs a high-resolution preprocessing operation 1212 on the high-resolution radar data. The high-resolution preprocessing operation 1212 may include a range FFT, DBF, and a noncoherent integration, as non-limiting examples. Additionally, the training device selects low-resolution radar data from the original raw radar data 1290 by performing a data selecting operation 1211 based on a dimension, for example, an angular dimension. For the data selecting operation 1211, reference may be made to what has been described above with reference to FIGS. 8 through 10. The training device performs a low-resolution preprocessing operation 1213 on the low-resolution radar data. The low-resolution preprocessing operation 1213 includes a range FFT, DBF, and MUSIC, as non-limiting examples.

As a result of the high-resolution preprocessing operation 1212, the training device generates ground truth data as a high-resolution training ground truth 1261. As a result of the low-resolution preprocessing operation 1213, the training device generates a low-resolution training input 1262. The result of the low-resolution preprocessing operation 1213 also includes a MUSIC result 1280 as an additional input. However, the additional input is not limited to the MUSIC result 1280, and may use results of other radar DoA estimation methods. The high-resolution training ground truth 1261 and the low-resolution training input 1262 may be range-angle maps.

However, the low-resolution preprocessing operation 1213 and the high-resolution preprocessing operation 1212 are not limited to what has been described in the foregoing, and the high-resolution preprocessing operation 1212 may further include an operation of performing a MUSIC algorithm and the low-resolution preprocessing operation 1213 may include only a range FFT and DBT. In such an example, a MUSIC result output in the high-resolution preprocessing operation 1212 may be used as an additional ground truth.

In an example, the training device trains the generator model 1240 and the discriminator model 1250 based on a result output by the discriminator model 1250 from a temporary high-resolution output 1270, the high-resolution training ground truth 1261, and DoA information estimated based on subspace type-based estimation. For example, the subspace type-based estimation may be a MUSIC algorithm, and the DoA information may be a MUSIC result value. The generator model 1240 and the discriminator model 1250 may be embodied as described above with reference to FIG. 6, but not limited thereto.

For example, the training device generates the temporary high-resolution output 1270 from the low-resolution training input 1262 based on the generator model 1240. For example, the training device generates the temporary high-resolution output 1270 by inputting the low-resolution training input 1262 to the generator model 1240 and sequentially propagating the low-resolution training input to layers including nodes included in the generator model 1240. Such a data propagating process in the generator model 1240 may be performed similarly to what has been described above with reference to FIG. 6. The training device inputs, to the discriminator model 1250, the temporary high-resolution output 1270 output by the generator model 1240, the high-resolution training ground truth 1261, and the DoA information, for example, a MUSIC result value, estimated based on the subspace type-based estimation.

The training device outputs authenticity-determining information 1259 based on the temporary high-resolution output 1270, the high-resolution training ground truth 1261, and the DoA information 1280 estimated based on the subspace type-based estimation, using the discriminator model 1250. The authenticity-determining information 1259 may be information indicating whether the temporary high-resolution output 1270 output by the generator model 1240 is real or fake, compared to the high-resolution training ground truth 1261 which is a reference ground truth. The training device calculates an adversarial loss based on the authenticity-determining information 1259 and trains the generator model 1240 and the discriminator model 1250 based on the calculated adversarial loss. The training device may individually train one of the generator model 1240 and the discriminator model 1250, or may train the two models 1240 and 1250 simultaneously or sequentially.

When the training is completed, the training device removes the discriminator model 1250 from the resolution increase model.

The MUSIC result 1280, which is an additional input used in the training process, may indicate locations of dominant signals. Thus, when the generator model 1240 generates the temporary high-resolution output 1270 irrespective of the locations of the dominant signals, the discriminator model 1250 may readily determine such output to be fake. Thus, to fool the discriminator model 1250, the trained generator model 1240 may generate output data representing DoA information that is accurately predicted as in MUSIC and ample information that may be represented by DBF of greater antenna data.

Referring to FIG. 13, a discriminator model may be removed from a resolution increase model after training is completed in a GAN architecture.

A radar data processing device generates raw radar data 1301 by a radar sensor based on transmission and reception of a radar signal. The radar data processing device performs a preprocessing operation 1310 on the generated raw radar data 1301. The preprocessing operation 1310 may include a range FFT and DBF, but is not limited thereto. The radar data processing device generates input data 1360 as a result of the preprocessing operation 1310. As illustrated in FIG. 13, the input data 1360 is a radar scan image of a range-angle map format, and has a considerably rough angular resolution because data corresponding to only six antennas is used as an input. The radar data processing device generates high-resolution output data 1370 from the input data 1360 generated by preprocessing the raw radar data 1301, based on the resolution increase model including a trained generator model 1340. The generated high-resolution output data 1370 may have a higher resolution than the input data 1360.

Figure 14:
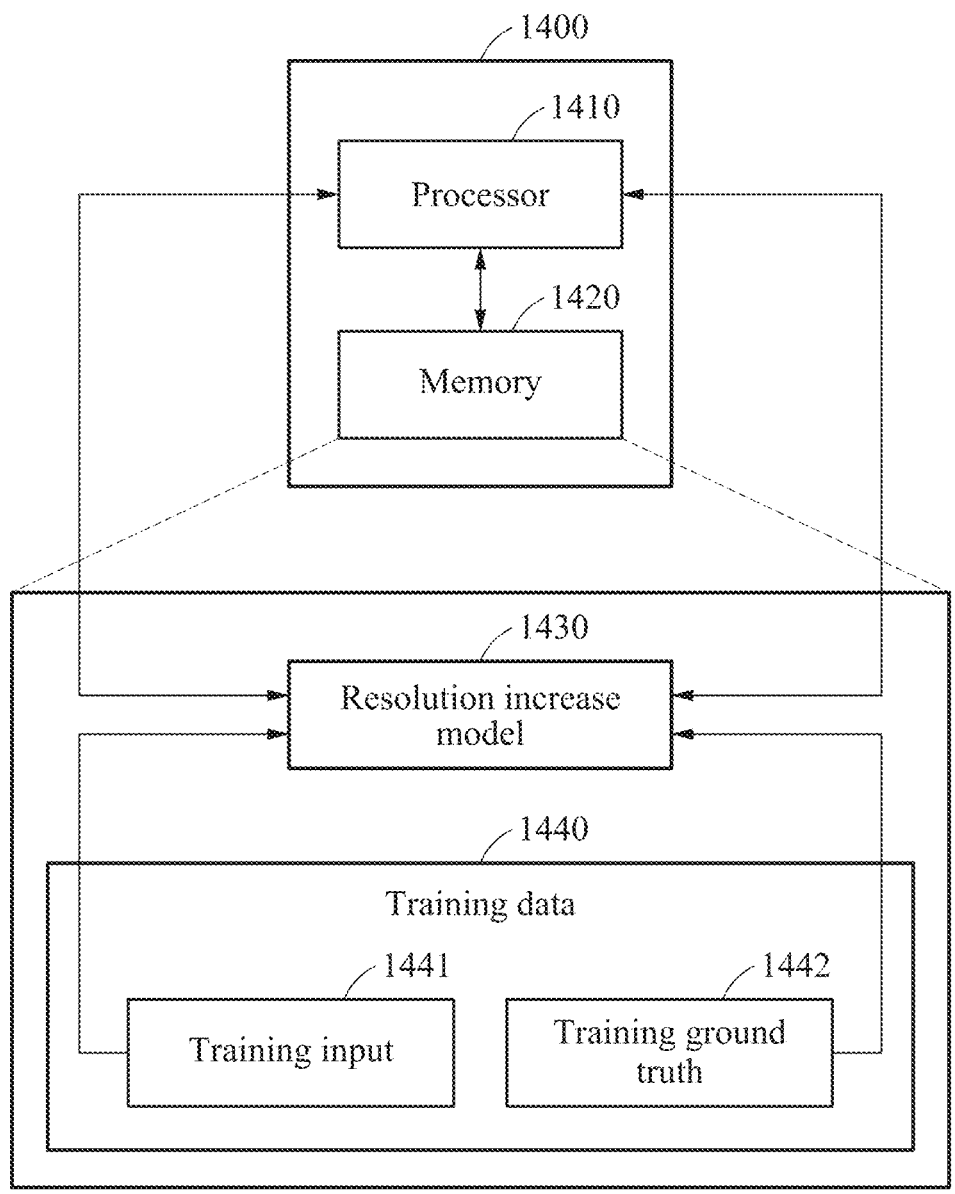
FIG. 14 illustrates an example of a training device, in accordance with one or more embodiments.

FIG. 14 illustrates an example of a training device.

Referring to FIG. 14, a training device 1400 includes a processor 1410 and a memory 1420. The processor 1410 and the memory 1420 may be respectively representative of one or more processors 1410 and one or more memories 1420. Though examples of FIGS. 14 and 15 discussed below, may be discussed as computing hardware or processor(s) implementing instructions, or such computing hardware or processor(s) and one or memories that store such instructions, examples are not limited thereto. For example, such operations may also be implemented solely through computing hardware, e.g., without some or all such instructions. Regardless, references to such computing hardware being configured to perform such operations may refer to any such computing hardware or processor only implementations, computing hardware or processor implementations through execution of stored or otherwise available instructions, or computing hardware or processors in combination with stored or otherwise available instructions.

Referring to FIG. 14, processor 1410 generates a high-resolution training ground truth 1442 and a low-resolution training input 1441 from original raw radar data based on information corresponding to at least one of dimensions defining or forming the original raw radar data. For example, the processor 1410 generates the high-resolution training ground truth 1442 and the low-resolution training input 1441 by selecting radar data from the original raw radar data based on at least one of a range dimension, an angular dimension, or a radial velocity dimension, and preprocessing the selected radar data. The processor 1410 trains a resolution increase model 1430 such that the high-resolution training ground truth 1442 is output from the low-resolution training input 1441. However, operations of the processor 1410 of the training device 1400 are not limited to what has been described above, and the processor 1410 may perform at least one of training related operations described above with reference to FIGS. 1 through 13 in parallel or in sequential order.

The memory 1420 stores the resolution increase model 1430. Additionally, the memory 1420 stores, temporarily or semi-permanently, training data 1440 and data needed to train the resolution increase model 1430. For example, the memory 1420 stores a temporary high-resolution output calculated from the training input 1441 based on the resolution increase model 1430. The training data 1440 includes a pair of the training input 1441 and the training output 1442.

Figure 15:
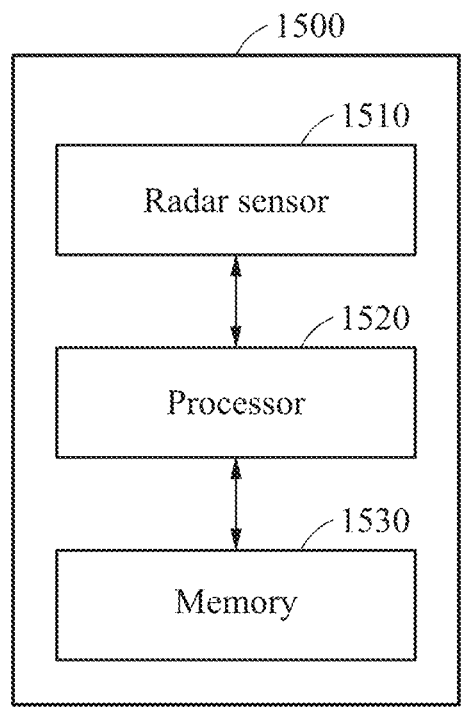
FIG. 15 illustrates an example of a radar data processing device, in accordance with one or more embodiments.

FIG. 15 illustrates an example of a radar data processing device.

Referring to FIG. 15, a radar data processing device 1500 includes a radar sensor 1510, a processor 1520, and a memory 1530. The processor 1520 and the memory 1530 may be respectively representative of one or more processors 1520 and one or more memories 1530.

The radar sensor 1510 generates raw radar data based on transmission and reception of a radar signal. The radar sensor 1510 may be configured as described above with reference to FIG. 2, but is not limited thereto.

The processor 1520 generates high-resolution output data from low-resolution input data generated by preprocessing the raw radar data based on a trained resolution increase model. The low-resolution input data may be, for example, a radar scan image in which the raw radar data is interpreted, and having a relatively low resolution due to a performance limitation of the radar sensor 1510. The low-resolution input data may also be referred to as input data. The high-resolution output data may be, for example, a radar scan image inferred from the low-resolution input data based on the resolution increase model, and having a relatively high resolution compared to the low-resolution input data.

For example, the processor 1520 inputs the low-resolution input data to the resolution increase model, and propagates it to each of layers in sequential order, and generates the high-resolution output data at a final layer. The resolution increase model may be of an architecture described above with reference to FIGS. 11 and 13, but is not limited thereto.

The processor 1520 may generate the low-resolution input data by performing a range FFT and DBF on the raw radar data. Additionally, the processor 1520 may generate, as the low-resolution input data, one of a range-Doppler map and a range-angle map. The processor 1520 may output, as the high-resolution output data, a map of a same type as a type of the low-resolution input data from the map generated as the low-resolution input data based on the resolution increase model. For example, when the processor 1520 generates the range-angle map as the low-resolution input data, the processor 1520 outputs the range-angle map as the high-resolution output data. However, operations of the processor 1520 are not limited to what has been described above, and the processor 1520 may perform, in parallel or in sequential order, at least one of operations for increasing a resolution described above with reference to FIGS. 1 through 13.

The memory 1530 may store the resolution increase model. In addition, the memory 1530 may store, temporarily or semi-permanently, information needed for a radar data processing method. For example, the memory 1530 may store preprocessing results, and a network architecture and parameters of the resolution increase model, for example, a connection weight between nodes.

Figure 16:
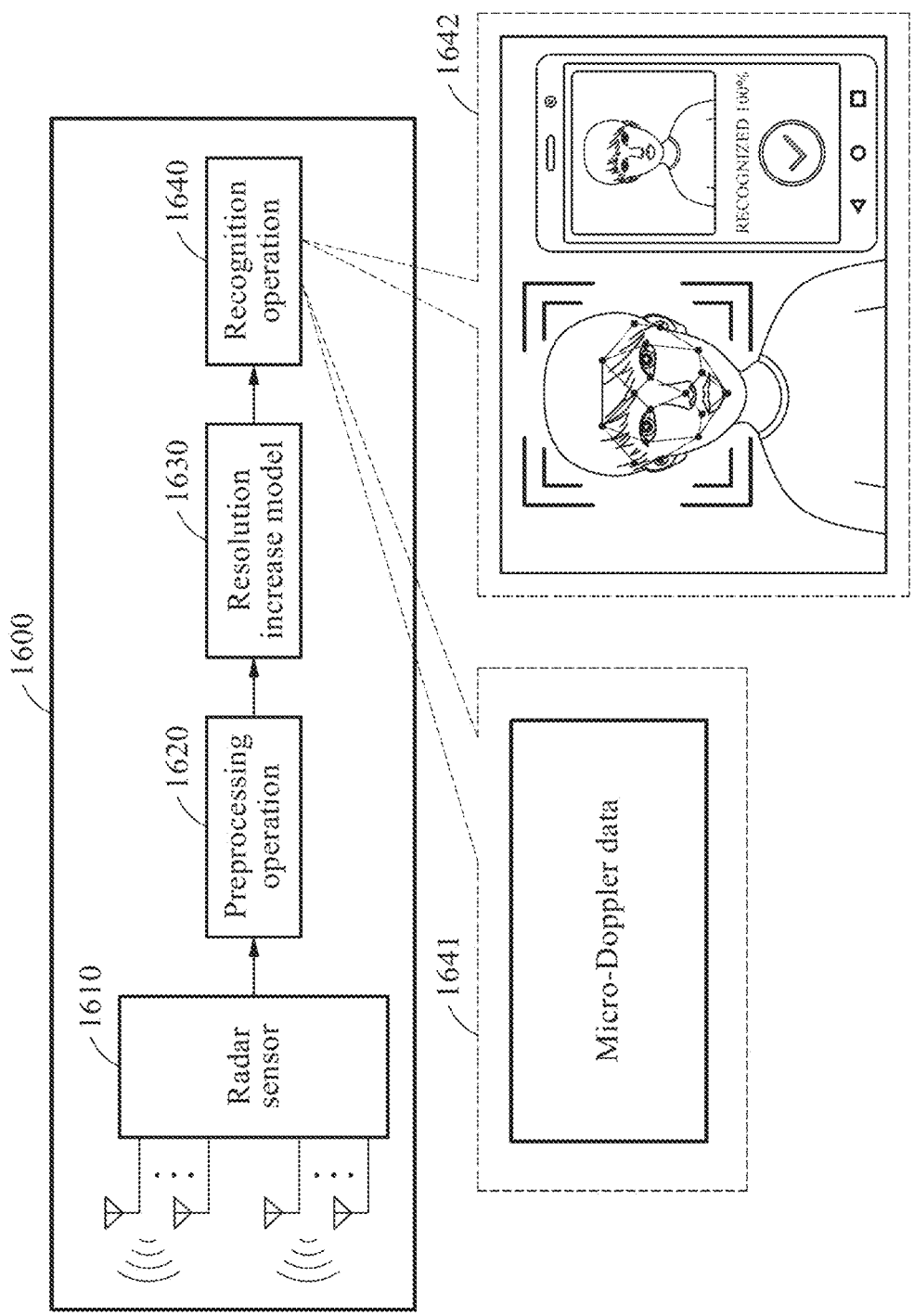
FIG. 16 illustrates an example of a radar data processing device embodied in a mobile terminal, in accordance with one or more embodiments.

FIG. 16 illustrates an example of a radar data processing device embodied in a mobile terminal, in accordance with one or more embodiments.

In the example of FIG. 16, a radar sensor 1610 is provided in a mobile terminal 1600. A radar data processing device is embodied as the mobile terminal 1600. The mobile terminal 1600 generates raw radar data when the radar sensor 1610 transmits a radar signal to at least one portion of an object, and receives a radar signal that is reflected from the object.

The mobile terminal 1600 may perform a preprocessing operation 1620 on the raw radar data. The mobile terminal 1600 may generate low-resolution input data as a result of the preprocessing operation 1620, and input the generated low-resolution input data to a resolution increase model 1630. The mobile terminal 1600 may generate high-resolution output data from the low-resolution input data based on the resolution increase model 1630.

The mobile terminal 1600 may perform a recognition operation 1640 based on the generated high-resolution output data. For example, the mobile terminal 1600 may recognize at least one of a gesture associated with an object or an identity of the object based on the high-resolution output data, and indicate a result of the recognizing. Such an operation of indicating the result of the recognizing may include explicitly or implicitly indicating the result of the recognizing. For example, when the mobile terminal 1600 recognizes a gesture associated with an object, the mobile terminal 1600 may execute an operation corresponding to the recognized gesture, for example, a function and/or an application. For another example, when the mobile terminal 1600 recognizes an identity of an object, the mobile terminal 1600 may unlock the mobile terminal 1600 that is previously locked in response to the identity of the object being recognized.

For example, when an application is related to gesture recognition 1641, an operation of extracting micro-Doppler (μD) data is performed as the preprocessing operation 1620. For another example, when an application is related to object recognition 1642 such as facial recognition, an antenna and a data related operation may need to be designed to extract data of a horizontal angle and an elevation angle.

For the gesture recognition 1641, the radar data processing device calculates the micro-Doppler data indicating a change in Doppler frequency based on a change in time through a short-time Fourier transform (STFT) as the preprocessing operation 1620. For data selection during a training process, a training device selects, from original raw radar data, radar data corresponding to a portion of chirp signals through several scanning times. The training device applies the STFT operation described in the foregoing as the preprocessing operation 1620 to each of low-resolution radar data and high-resolution radar data in the selected radar data.

Figure 17:
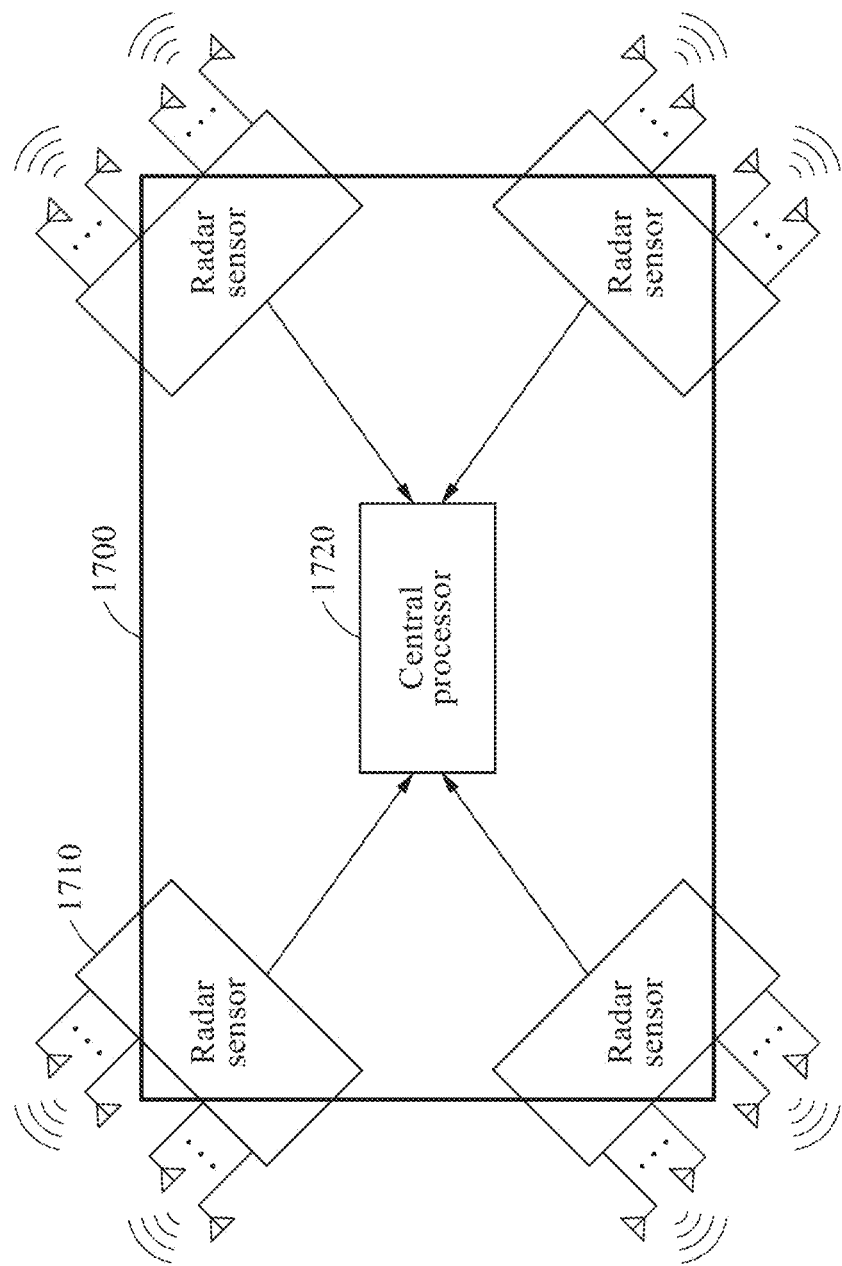
FIG. 17 illustrates an example of a radar data processing device embodied in a vehicle, in accordance with one or more embodiments.

FIG. 17 illustrates an example of a radar data processing device embodied in a vehicle, in accordance with one or more embodiments.

In the example of FIG. 17, a plurality of radar sensors 1710 is provided in a vehicle 1700. For example, the radar sensors 1710 may be provided to have different viewing angles. The radar sensors 1710 may be provided to be oriented in different directions. A portion of the viewing angles of the radar sensors 1710 may overlap, but the embodiments are not limited thereto.

A radar data processing device may transfer low-resolution raw radar data from the radar sensors 1710 to a central processor 1720. The central processor 1720 generates high-resolution output data from the low-resolution raw radar data based on a resolution increase model. The central processor 1720 generates driving-related information based on the high-resolution output data. The driving-related information may include, for example, a map indicating locations, directions, and distances of objects present around the vehicle 1700, information indicating a potential danger or risk present therearound, navigation information of the vehicle 1700, and the like.

Here, raw radar data to be generated by a radar sensor may have information of a higher dimension, and thus data may be large in size. Thus, when multiple radars monitor the entire environment around the vehicle 1700, a data quantity of the raw radar data may be large. In an example, the radar data processing device collects low-resolution radar data from each radar sensor, and generates high-resolution output data from the low-resolution radar data based on the resolution increase model. In this example, in a transmission process, the low-resolution radar data is transmitted, and thus an overhead in the data transmission may decrease. In addition, the radar data processing device generates driving-related information by generating the high-resolution output data using the resolution increase model, and may thus generate more accurate driving-related information.

Thus, in a radar for the vehicle 1700, the radar data processing device may provide advantageous effects in accurately estimating locations and velocities, lightening hardware, and reducing raw data transmission overhead, through an improved resolution.

In the example of FIG. 17, a separate signal processor, for example, the central processor 1720, which is configured to receive data from one or more radars, is illustrated to generate high-resolution output data from low-resolution input data using a resolution increase model. However, examples are not limited to the foregoing example. An individual radar sensor may include a resolution increase model, and may generate high-resolution output data using the resolution increase model by increasing a resolution of low-resolution input data collected by the radar sensor with respect to at least one dimension.

The resolution increase model may be provided in the vehicle 1700 as illustrated in FIG. 17, and may be applied to detect an object that is present within a predetermined range of the vehicle 1700, and estimate a location of the vehicle 1700, thereby being applicable to autonomous driving. However, examples of applications are not limited to what has been described in the foregoing, and radar data described herein may be combined with sensing data of different types of sensors such as cameras, ultrasonic radars, and LiDARs, or with information in global positioning systems (GPSs) or vehicle to everything (V2X) communication, and thus may be used to provide more precise advanced driver assistance system (ADAS) technology.

The recognition apparatuses, training apparatuses, training apparatus 1400, radar sensor 210, processor 1410, memory 1420, processor 1520, memory 1530, processing device 1600, sensors 1710, with respect to FIGS. 1-17, and that perform operations described in this application are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-17 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
    executing computer readable code, stored in a non-transitory computer-readable storage medium, by a processor and configuring the processor, through the execution, to perform operations of:
    identifying information of at least one of dimensions defining an original raw radar data;
    generating a high-resolution training ground truth and a low-resolution training input from obtained original raw radar data based on the identified information; and
    iteratively training a machine learning radar resolution increase model based on the low-resolution training input and the high-resolution training ground truth.

2. The method of claim 1, wherein the dimensions defining the original raw radar data comprise one of a Doppler velocity, a horizontal angle, an elevation angle, and a range, or a combination of two or more of the Doppler velocity, the horizontal angle, the elevation angle, and the range.

3. The method of claim 1, wherein the generating of the high-resolution training ground truth and the low-resolution training input comprises:
    selecting low-resolution radar data from the original raw radar data; and
    generating the low-resolution training input by preprocessing the selected low-resolution radar data.

4. The method of claim 3, wherein the selecting of the low-resolution radar data comprises:
    selecting, as the low-resolution radar data, radar data corresponding to a first part of antenna channels from the original raw radar data in an angular dimension.

5. The method of claim 3, wherein the selecting of the low-resolution radar data comprises:
    selecting, as the low-resolution radar data, radar data corresponding to a portion of chirp signals implemented for single scanning from the original raw radar data in a Doppler velocity dimension.

6. The method of claim 3, wherein the selecting of the low-resolution radar data comprises:
    selecting, as the low-resolution radar data, radar data corresponding to a first part of bandwidths allocated to the original raw radar data in a range dimension.

7. The method of claim 3, wherein the generating of the low-resolution training input by preprocessing the selected low-resolution radar data comprises:
    performing a range fast Fourier transform (FFT) process and a digital beamforming (DBF) process on the selected low-resolution radar data.

8. The method of claim 7, wherein the generating of the low-resolution training input by preprocessing the selected low-resolution radar data comprises:
    generating at least one of a range-Doppler map and a range-angle map from the low-resolution radar data.

9. The method of claim 1, wherein the generating of the high-resolution training ground truth and the low-resolution training input comprises:
    selecting high-resolution radar data from the original raw radar data; and
    generating the high-resolution training ground truth by preprocessing the selected high-resolution radar data.

10. The method of claim 1, wherein the radar resolution increase model comprises a neural network, the neural network comprising a convolution layer,
    wherein the training of the radar resolution increase model comprises:

further training the radar resolution increase model based on direction-of-arrival (DoA) information estimated based on subspace type-based estimation.

11. The method of claim 1, wherein the training the radar resolution increase model comprises training a temporary radar resolution increase model that comprises a generator model and a discriminator model,
wherein the training of the temporary radar resolution increase model comprises:
generating a temporary high-resolution output from the low-resolution training input based on the generator model;
training the generator model and the discriminator model based on a result output by the discriminator model from the temporary high-resolution output, the high-resolution training ground truth, and DoA information estimated based on subspace type-based estimation; and
in response to the training of the temporary radar resolution increase model being determined completed, removing the discriminator model from the temporary radar resolution increase model to generate the trained radar resolution increase model.

12. A processor-implemented radar data processing method comprising:
generating, by a radar sensor, raw radar data based on transmission of a radar signal by the sensor and reception of a radar signal by the sensor;
generating high-resolution output data from input data generated by preprocessing the generated raw radar data based on a trained radar resolution increase model; and
generating driving-related information based on the generated high-resolution output data.

13. The method of claim 12, wherein the generating of the high-resolution output data comprises:
generating the input data by performing a range fast Fourier transform (FFT) process and a digital beamforming (DBF) process on the raw radar data.

14. The method of claim 12, wherein the generating of the high-resolution output data comprises:
generating, as the input data, one of a range-Doppler map and a range-angle map; and
outputting, as the high-resolution output data, a map of a same type as a type of the input data from a map generated as the input data based on the resolution increase model.

15. The method of claim 12, wherein the radar sensor is implemented in a mobile terminal,
wherein the generating of the raw radar data comprises:
generating, by the radar sensor, the raw radar data by transmitting a radar signal to at least a portion of an object and receiving a radar signal reflected from the portion of the object, and
the method further comprising:
recognizing at least one of a gesture associated with the object or an identity of the object based on the high-resolution output data, and indicating a result of the recognizing.

16. The method of claim 12, wherein the radar sensor is implemented as a plurality of radar sensors in a vehicle,
the method further comprising:
transferring low-resolution raw radar data from the plurality of radar sensors to a central processor; and
generating, by the central processor, the high-resolution output data from the low-resolution raw radar data based on the radar resolution increase model.

17. A non-transitory computer-readable storage medium storing instructions that, when executed by one or more processors, cause the one or more processors to perform the method of claim 12.

18. A training device comprising:
a memory configured to store a resolution increase model; and
a processor configured to receive original raw radar data, and generate a high-resolution training ground truth and a low-resolution training input from the original raw radar data based on information corresponding to at least one of dimensions defining the original raw radar data, and train the resolution increase model such that the high-resolution training ground truth is output from the low-resolution training input.

19. A processor-implemented training method comprising:
transmitting, by a sensor, a radar signal to an object;
receiving a reflection of the transmitted radar signal from the object;
generating raw radar data from the received reflection of the transmitted radar signal;
perform a high-resolution preprocessing operation on the raw radar data to generate a high-resolution training ground truth data;
performing a low-resolution preprocessing operation on low-resolution radar data selected from the raw radar data to generate a low-resolution training input; and
training a generator model and a discriminator model based on the low-resolution training input, the high-resolution training ground truth, and direction-of-arrival (DoA) information estimated based on subspace type-based estimation.

20. The method of claim 19, wherein the high-resolution preprocessing operation comprising one or more of a range fast Fourier transform (FFT) process, a digital beamforming (DBF) process, and a non-coherent integration process.

21. The method of claim 1, further comprising providing the radar resolution increase model for detecting at least one object based on the radar resolution increase model.

22. The method of claim 1, wherein generating comprises generating, as the low-resolution training input, a radar scan image from a low-resolution radar data of the original raw radar data, the radar scan image being one of a range-Doppler map and a range-angle map.

* * * * *